(12) United States Patent
Mock et al.

(10) Patent No.: US 12,415,413 B2
(45) Date of Patent: Sep. 16, 2025

(54) THREE SPEED PLANETARY TRANSMISSION

(71) Applicant: Allison Transmission, Inc., Indianapolis, IN (US)

(72) Inventors: Isaac Mock, Martinsville, IN (US); Joel E. Mowatt, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/071,704

(22) Filed: Nov. 30, 2022

(65) Prior Publication Data

US 2024/0174071 A1 May 30, 2024

(51) Int. Cl.
*B60K 6/365* (2007.10)
*F16H 3/66* (2006.01)

(52) U.S. Cl.
CPC .............. *B60K 6/365* (2013.01); *F16H 3/66* (2013.01); *F16H 2200/0039* (2013.01); *F16H 2200/0091* (2013.01); *F16H 2200/2007* (2013.01); *F16H 2200/2038* (2013.01); *F16H 2200/2064* (2013.01)

(58) Field of Classification Search
CPC ... B60K 6/365; F16H 3/66; F16H 2200/0039; F16H 2200/0091; F16H 2200/2007; F16H 2200/2038; F16H 2200/2064
See application file for complete search history.

(56) References Cited

U.S. PATENT DOCUMENTS

| | | | |
|---|---|---|---|
| 2,180,671 A | 11/1939 | Gaston | |
| 2,806,388 A | 9/1957 | Simpson | |
| 2,856,795 A | 10/1958 | Simpson | |
| 2,914,967 A | 12/1959 | Simpson | |
| 2,939,341 A | 6/1960 | Evernden | |
| 3,946,623 A | 3/1976 | Murakami et al. | |
| 4,019,406 A | 4/1977 | Herr | |
| 4,046,031 A | 9/1977 | Ott | |
| 4,483,215 A | 11/1984 | Ishimaru et al. | |
| 4,653,348 A | 3/1987 | Hiraiwa | |

(Continued)

FOREIGN PATENT DOCUMENTS

| | | |
|---|---|---|
| CN | 1400409 | 10/2014 |
| CN | 106696690 A | 5/2017 |

(Continued)

OTHER PUBLICATIONS

English abstract for CN 106696690 A obtained from Googe Patents on Apr. 13, 2023.

*Primary Examiner* — Tisha D Lewis

(74) *Attorney, Agent, or Firm* — Woodard Emhardt Henry Reeves & Wagner LLP

(57) ABSTRACT

A drive system for a hybrid or electric vehicle that includes a transmission with three forward and three reverse gears. The transmission optionally includes a first and a second planetary gearset, a first and a second clutch, and a brake. The system may be configured to separately engage these components in concert. The drive system may include a single electric motor with a corresponding transmission, or multiple electric motors individually driving separate transmissions. Motors may be arranged upstream or downstream of portions of a transmission, and they may be aligned parallel with or perpendicular to a drive axle.

20 Claims, 19 Drawing Sheets

(56) References Cited

U.S. PATENT DOCUMENTS

| | | |
|---|---|---|
| 4,722,242 A | 2/1988 | Miura |
| 5,194,055 A | 3/1993 | Oshidari |
| 5,419,406 A | 5/1995 | Kawamoto et al. |
| 5,924,951 A | 7/1999 | Winzeler et al. |
| 8,522,634 B2 | 9/2013 | Bridges |
| 8,870,712 B2 | 10/2014 | Steinborn et al. |
| 9,005,071 B2 | 4/2015 | Smemo et al. |
| 9,254,740 B2 | 2/2016 | Lamperth |
| 9,321,342 B2 | 4/2016 | Liu et al. |
| 9,447,848 B2 | 9/2016 | Beck |
| 9,707,834 B2 | 7/2017 | Lee et al. |
| 10,093,168 B2 | 10/2018 | Hays et al. |
| 10,408,309 B2 | 9/2019 | Beck et al. |
| 10,598,257 B2 | 3/2020 | Eo et al. |
| 10,807,466 B1 | 10/2020 | Haka et al. |
| 10,882,389 B2 | 1/2021 | Kucharski |
| 11,124,064 B2 | 9/2021 | Kaltenbach et al. |
| 11,149,833 B2 | 10/2021 | Maguire et al. |
| 11,198,356 B2 | 12/2021 | Brammer et al. |
| 11,320,025 B2 | 5/2022 | Ye et al. |
| 11,338,672 B2 | 5/2022 | Varela |
| 11,828,351 B1 | 11/2023 | Mock et al. |
| 2004/0121877 A1 | 6/2004 | Lee et al. |
| 2005/0023056 A1 | 2/2005 | Harrup et al. |
| 2007/0093342 A1 | 4/2007 | Pesiridis et al. |
| 2009/0118060 A1 | 5/2009 | Kirkwood et al. |
| 2011/0027105 A1 | 2/2011 | Haupt et al. |
| 2014/0221149 A1 | 8/2014 | Wilton et al. |
| 2014/0349802 A1 | 11/2014 | Steiner et al. |
| 2016/0091070 A1 | 3/2016 | Park et al. |
| 2017/0175855 A1 | 6/2017 | Etchason |
| 2018/0119784 A1 | 5/2018 | Cui |
| 2018/0134140 A1* | 5/2018 | Brehmer ........... B60K 6/547 |
| 2018/0172124 A1 | 6/2018 | Valente et al. |
| 2021/0252974 A1* | 8/2021 | Nakashima ........ F16D 41/12 |
| 2021/0291646 A1 | 9/2021 | Lorenz et al. |
| 2021/0372506 A1 | 12/2021 | McGrew, Jr. et al. |
| 2022/0034385 A1 | 2/2022 | Beaudoin |
| 2022/0227370 A1 | 7/2022 | Desmeules et al. |
| 2023/0392673 A1 | 12/2023 | Mock et al. |

FOREIGN PATENT DOCUMENTS

| | | | |
|---|---|---|---|
| DE | 102010045350 | 3/2012 | |
| DE | 102017004898 A1 | 11/2018 | |
| DE | 102017011401 A1 | 6/2019 | |
| DE | 102018122936 A1 * | 3/2020 | ........ F16H 3/62 |
| DE | 102018131492 A1 * | 6/2020 | ........ F16H 37/08 |
| DE | 102019206545 A1 | 11/2020 | |
| DE | 102019119946 B3 * | 12/2020 | ........ F16H 3/66 |
| GB | 910653 | 11/1962 | |
| JP | 2785325 B2 | 8/1998 | |
| WO | WO 2012053142 | 4/2012 | |

* cited by examiner

THREE SPEED PLANETARY TRANSMISSION

BACKGROUND

In recent years, larger and heavier vehicles have switched from internal combustion power to fully electric or hybrid drive systems. As the electric motor becomes a primary power source, transmission development has shifted to accommodate the broader power curve common with such motors. Thus, transmissions configured for internal combustion engines are often overly complex and inefficient when paired with an electric motor. Electric motor drive trains thus offer new opportunities for simpler and more reliable transmission designs with fewer wear parts that are potentially smaller, lighter, and easier to manufacture.

SUMMARY

Disclosed is a drive system for a fully electric or hybrid vehicle that optionally includes a first and a second planetary gearset having a sun gear, a carrier with planetary gears, and a ring gear. The carrier of the first planetary gearset is optionally coupled to the sun gear of the second planetary gearset, and the ring gear of the first planetary gearset may be coupled to the carrier of the second planetary gearset. The disclosed drive system optionally includes a first clutch operable to selectively couple an input shaft to the carrier of the first planetary gearset, and the sun gear of the second planetary gearset. A second clutch may be included that is operable to selectively couple the ring gear of the first planetary gearset to the input shaft. A brake may also be included that is operable to selectively couple the ring gear of the second planetary gearset to ground. In another aspect, the carrier of the second planetary gearset is coupled to an output shaft.

In another example, a transmission of the present disclosure includes a first and a second planetary gearset each having a sun gear, a carrier with planetary gears, and a ring gear. The carrier of the first planetary gearset is optionally coupled to the sun gear of the second planetary gearset, and the ring gear of the first planetary gearset may be coupled to the carrier of the second planetary gearset. A first clutch may be included that is operable to selectively couple an input shaft to the carrier of the first planetary gearset, and to the sun gear of the second planetary gearset. A second clutch may be included that is operable to selectively couple the ring gear of the first planetary gearset to the input shaft, while a brake may be included that is operable to selectively couple the ring gear of the second planetary gearset to ground. In another aspect, the carrier of the second planetary gearset is optionally coupled to an output shaft that is coupled to a drive axle. In another aspect, an electric motor may be included that is arranged and configured to transmit torque to the transmission via the input shaft.

In another example of a drive system of the present disclosure, the drive system includes a first and a second electric motor providing torque separately to a first and a second transmission via a first and a second input shafts coupling the first electric motor to the first transmission, and the second electric motor to the second transmission. In another aspect, the first and second transmissions optionally include a first and a second planetary gearset having a sun gear, a carrier with planetary gears, and a ring gear. The carrier of the first planetary gearset is optionally coupled to the sun gear of the second planetary gearset, and the ring gear of the first planetary gearset may be coupled to the carrier of the second planetary gearset. In another aspect, the transmission includes first clutch operable to selectively couple an input shaft to the carrier of the first planetary gearset, and the sun gear of the second planetary gearset. A second clutch may be included that is operable to selectively couple the sun gear of the first planetary gearset to the input shaft. In another aspect, the transmission optionally includes a brake operable to selectively couple the ring gear of the second planetary gearset to ground. An output shaft coupled to the carrier of the second planetary gearset may also be included. In another aspect, the output shaft of the first transmission may be coupled to a first ground engaging member, and the output shaft of the second transmission is optionally coupled to a second ground engaging member that is separate from the first ground engaging member.

Further forms, objects, features, aspects, benefits, advantages, and embodiments of the present invention will become apparent from a detailed description and drawings provided herewith.

DETAILED DESCRIPTION

Figure 1:
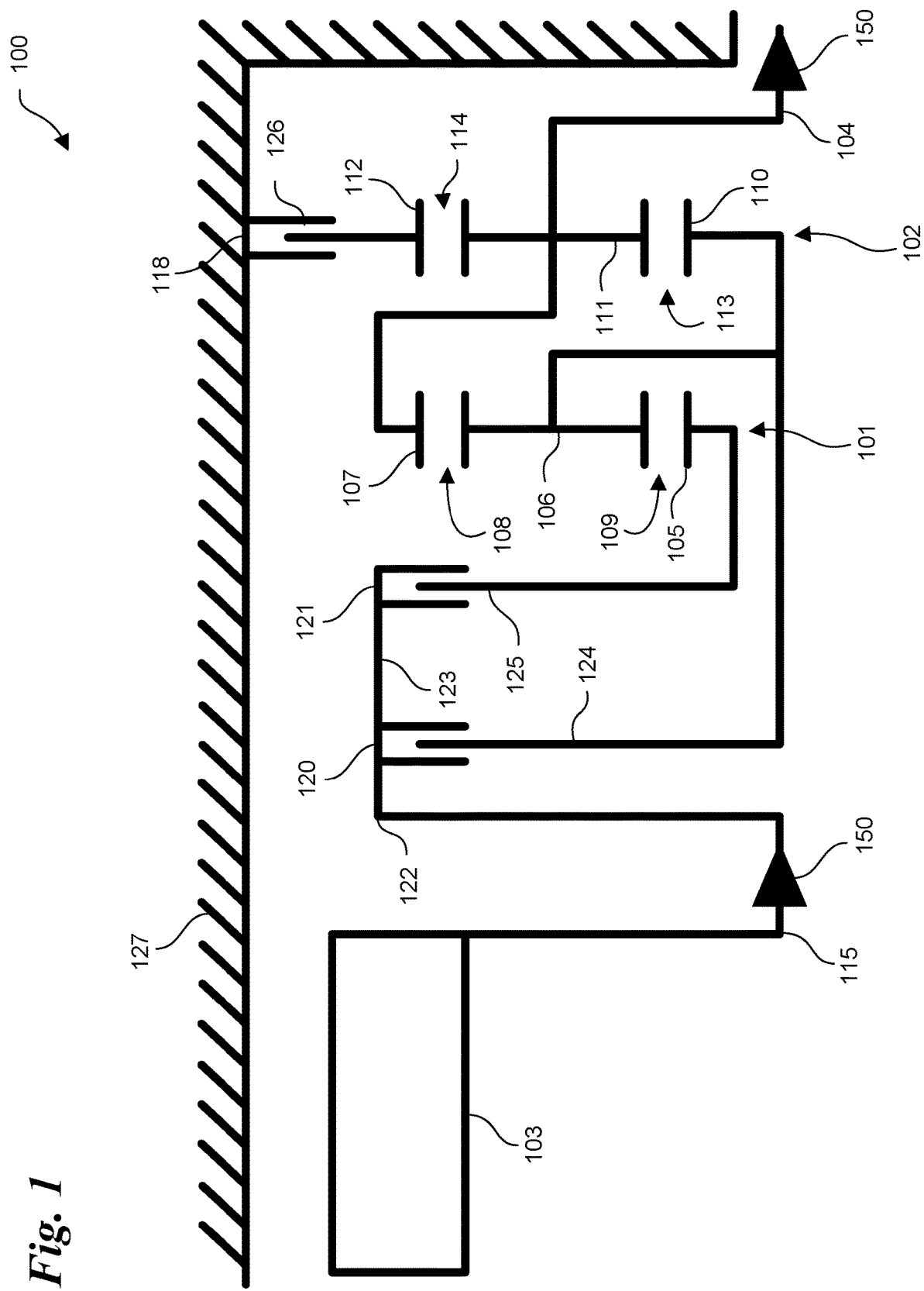
FIG. 1 is a schematic diagram illustrating one example of the components and configuration of a drive system of the present disclosure.

Illustrated in FIG. 1 at 100 is one example of a drive system or drivetrain of the present disclosure. In this example, the motor is arranged upstream of the transmission, or in other words, the transmission is downstream from the motor. A first planetary gearset 101 and a second planetary gearset 102 are optionally included and coupled to the drivetrain between an electric motor 103 and an output shaft 104. In this example, planetary gearsets 101 and 102, and other transmission components are mounted downstream of the electric motor 103. Power flows from left to right in FIG. 1 according to arrows 150 with the electric motor 103 upstream of the gearsets 101 and 102 and the output shaft 104.

The gearset 101 optionally includes a sun gear 105, a carrier 106 to which is mounted one or more planetary gears that are arranged and configured to engage a ring gear 107 at 108, and the sun gear 105 at 109. The gearset 102 optionally includes a sun gear 110, a carrier 111 with one or more planetary gears mounted to it, and a ring gear 112. The planetary gears are arranged and configured to engage the ring gear 112 at 114, and the sun gear 110 at 113.

In another aspect, the carrier 106 of the first planetary gearset 101 is optionally coupled to the sun gear 110 of the second planetary gearset 102. In another aspect, the ring gear 107 of the first planetary gearset 101 is optionally coupled to the carrier 111 of the second planetary gearset 102. In another aspect, the first gearset 101 is downstream of the motor 103, and upstream of the second planetary gearset 102.

An input shaft 115 is coupled to the motor 103 and to the input side 122 of a first clutch 120, and to the input side 123 of a second clutch 121. The first clutch 120 is operable to selectively couple the input shaft 115 to the carrier 106 of the first planetary gearset 101, and optionally to the sun gear 110 of the second planetary gearset 102. The second clutch 121 may be operable to selectively couple the sun gear 105 of the first planetary gearset 101 to the input shaft 115. A brake 126 may be arranged and configured to selectively couple the ring gear 112 of the second planetary gearset 102 to ground 118. A housing 127 that at least partially surrounds the first and second planetary gearsets may be arranged and configured to operate as the ground 118. In another aspect, the carrier 111 of the second planetary gearset 102 is optionally coupled to an output shaft 104.

In another aspect, the clutch 120 may be operable to selectively couple the input shaft 115 to the carrier 106 of the first gearset 101. In another aspect, the clutch 121 may be operable to selectively couple the input shaft 115 to the sun gear 110 of the second gearset 102. In another aspect, the carrier 106 of the first gearset 101 is optionally coupled to the sun gear 110 of the second gearset 102. By engaging the clutch 120 and 121, the drivetrain may provide a 1:1 gear ratio between the input shaft 115 and the output shaft 104.

The clutch 121 may be operable to selectively couple the input shaft 115 to the sun gear 105 of the first planetary gearset 101. In another aspect, a drive system of the present disclosure is optionally arranged and configured such that the sun gear 105 of the first planetary gearset 101 is coupled to an output side 125 of the clutch 121. The sun gear 110 of the second planetary gearset 102, and the carrier 106 of the first planetary gearset 101 are optionally coupled to an output side 124 of the clutch 120. In another aspect, an input side of clutch 121 is optionally coupled to an input side 122 of the clutch 120. In another aspect, both the input side 122, and the input side 123 of clutches 120 and 121 respectively may be coupled together and may be configured to receive input torque from input shaft 115.

In another aspect, the first and second planetary gear sets 101, and 102 optionally define substantially similar gear ratios. In one example, a first gear ratio defined by the first planetary gearset 101 and a second gear ratio defined by the second planetary gearset 102 differ by less than 0.01:1, by less than 0.5:1, or by less than 2:1. For example, gearset 101 may define a gear ratio of 3:1 and gearset 102 may define a gear ratio of 3:1 making the two gear ratios equal. In another example, planetary gearset 101 defines a gear ratio of 4.5:1 and gearset 102 may define a gear ratio of 4.2:1 making the two gear ratios substantially similar and differing by less than 0.5:1.

In another aspect, the drivetrain of the present disclosure is optionally configured to be operated such that first clutch, the second clutch, and the brake may be individually actuated to provide three forward, and the reverse gears. A neutral gear may be provided by disengaging all of the clutches and the brake at the same time. A wide range of gear ratios are available according to the power output available from the electric motor and the sizes of the gears in planetary gear sets.

For example, the drive system of the present disclosure is optionally configured so that the first clutch 120, the second clutch 121, and the brake 126 are each engaged separately at different times to provide three separate speed ratios of the input shaft 115 relative to the output shaft 104. Three separate reverse gear ratios are optionally available by reversing the rotation of the electric motor 103. The rotational direction of the input shaft 115 is optionally directly linked to the rotational direction of the output shaft 104 to facilitate the reverse drive capability. In this way the drive system of the present disclosure is simplified to reduce or eliminate the need for a separate reversing mechanism.

In another aspect, the first clutch 120, the second clutch 121, and the brake 126 are optionally individually engaged such that only two of the three are engaged at any time, and when in neutral, none of them are engaged. For example, engaging the second clutch 121 and the brake 126 optionally provides a first gear ratio of the three separate speed ratios (input shaft 115 to output shaft 104) that is less than or equal to 3:1, greater than 3:1, greater than 5:1, greater than 6:1, greater than 7:1, or more. These gear ratios may be achieved in the forward or reverse direction, with the reverse direction achieved by rotating the electric motor 103 in the opposite direction. In one more specific example, the first gear speed ratio is about 6.6:1.

A second gear may be achieved by the drive system of the present disclosure by engaging the first clutch 120, and the brake 126. This may provide a second gear ratio of the three separate speed ratios that is greater than 1.5:1, greater than 2:1, greater than 3.5:1, greater than 4:1, or more. Any suitable gear ratio may be used for second gear. Second gear ratios may be achieved in the forward or reverse direction by rotating the motor 103 in either the forward or reverse direction. In one more specific example, the second gear speed ratio is about 2.65:1.

The drive system of the present disclosure may achieve a third gear ratio by engaging the first clutch 120 and the second clutch 121 while the brake 126 is disengaged. Thus a 1:1 gear ratio may be obtained. Other gears may be included as well in the drive system rendering a third gear ration of the three separate speed ratios that is less than or equal to 0.5:1, greater than 0.5:1, greater than 1:1, greater than 1.5:1, or more. Any suitable gear ratio may be used for third gear. Third gear ratios may be achieved in either a forward or a reverse driving mode by rotating the motor 103 in either the forward or reverse direction while the first and second clutches are engaged. In one more specific example, the third gear speed ratio is about 1:1 thus providing a direct drive from the electric motor 103 to the output shaft 104.

One example of the operational scheme for the transmission of the present disclosure is defined as shown in Table 1:

TABLE 1

| Range | First Clutch | Second Clutch | Brake |
|---|---|---|---|
| 1st | | X | X |
| 2nd | X | | X |
| 3rd | X | X | |
| Neutral | | | |

A first gear is optionally defined by engaging the second clutch 121 and the brake 126. A second gear may be defined by engaging the first clutch 121 and the brake 126. A third gear is defined by engaging the first clutch 120 and the second clutch 121. In another aspect, the drivetrains of the present disclosure may define first, second, and third gears by engaging two of the first and second clutches and the brake together at different times to provide three separate speed ratios of the input shaft relative to the output shaft.

The drive system is optionally configured to shift between gear ratios by inverting the engagement state of two of the first and second clutches and the brake while maintaining the remaining first or second clutch or brake in an engaged state. For example, looking at the table above, clutch 120 is disengaged in first gear, while clutches 121 and brake 126 are engaged. When shifting to second gear, the engagement state of clutch 120 and clutch 121 are inverted from disengaged to engaged, while the engagement state of brake 126 remains unchanged. When shifting from second gear to third gear, once again, the engagement state two of the elements is inverted while the remaining element remains unchanged. Clutch 121 inverts from an unengaged state to an engaged state, while the brake 126 changes from engaged state to an unengaged state. Clutch 120 remains engaged. Thus, the transmission of the present disclosure is operable to shift gears with only one off going clutch or brake, and one oncoming clutch or brake thus avoiding a double transition shift scenario.

In another aspect, the first clutch 120, the second clutch 121, the brake 126 may be optionally implemented with one or more frictional elements selectively placed in contact with one another. First clutch 120 may include multiple sets of frictional elements that are rotatable and are interspersed between each other. One set may be coupled to the input side 122 where power is received from motor 103, while the other set of frictional elements may be coupled to the output side 124 of the clutch from which downstream components receive torque passed through from the input side. By selectively applying a compression force to the multiple sets of frictional components, the input side 122 and the output side 124 may be held stationary with respect to each other while the compression force is maintained. This allows torque applied to the input side 122 (such as from the motor 103) to be selectively transmitted to the output side 124 and anything coupled to it according to the compression applied by the clutch 120. It may thus be said that clutch 120 is "engaged" or "activated" when a compression force is applied to the frictional components. Clutch 120 may be thought of as "fully engaged" when the relative movement of the input side 122 to the output side 124 is insignificantly small or substantially zero.

Second clutch 121 may operate similarly to clutch 120 and include multiple sets of frictional elements that are rotatable and are interspersed between each other. One set may be coupled to the input side 123 where power is received from motor 103, while the other set of frictional elements may be coupled to the output side 125 of the clutch. By selectively applying a compression force to the multiple sets of frictional components, the input side 123 and the output side 125 may be held stationary with respect to each other while the compression force is maintained. This allows torque applied to the input side 123 to be selectively transmitted to the output side 125 and thus two other elements of the drivetrain coupled to it according to the compression applied by the clutch 121. It may thus be said that clutch 121 is "engaged" or "activated" when a compression force is applied to the frictional components of the clutch. Clutch 121 may be thought of as "fully engaged" when the relative movement of the input side 123 to the output side 125 is insignificantly small or substantially zero.

Brake 126 may include a friction braking system with one or more rotatable braking components interspersed between one or more stationary braking components. By selectively applying a compression force to the braking components, the rotating components may be pressed against the stationary components until the rotation is brought to a complete stop thus "grounding" the rotating portion of the braking assembly to the stationary components while the compression force is maintained. It may thus be said that brake 126 is "engaged" or "activated" when a compression force is applied to the braking components. Brake 126 may be thought of as "fully engaged" when the relative movement of the stationary braking components to the rotatable components is insignificantly small or substantially zero.

In another aspect, first clutch 120, second clutch 121, or brake 126 may include one or more dog clutches or synchronizers having rotating components that engage by interference or clearance fit thus reducing or eliminating the opportunity for slip. A dog clutch configuration may be useable either in place of the frictional components described for the components 120, 121, and/or 126 above, or along with them.

Figure 2:
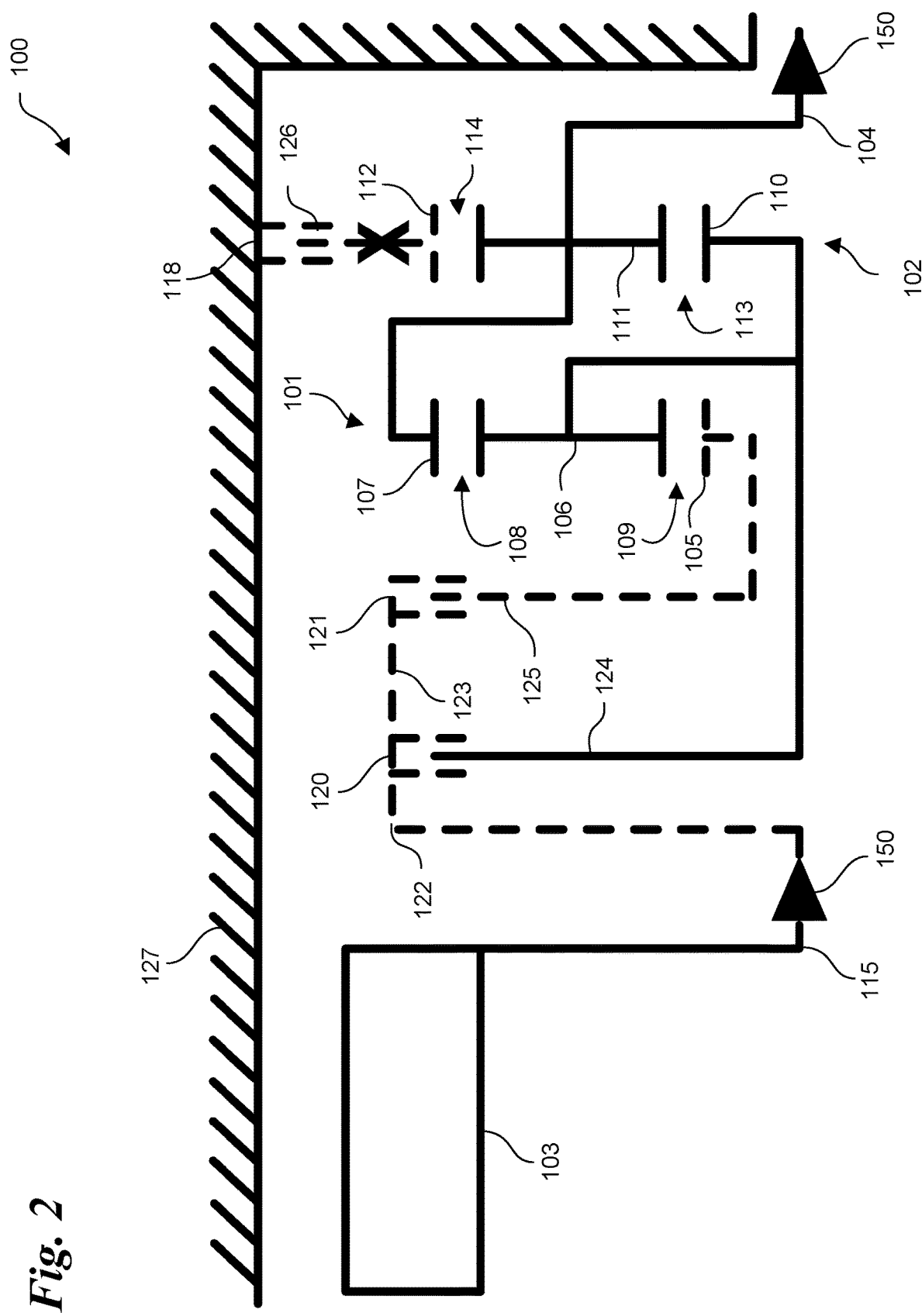
FIG. 2 is a schematic diagram illustrating the example of FIG. 1 in operation.
Figure 3:
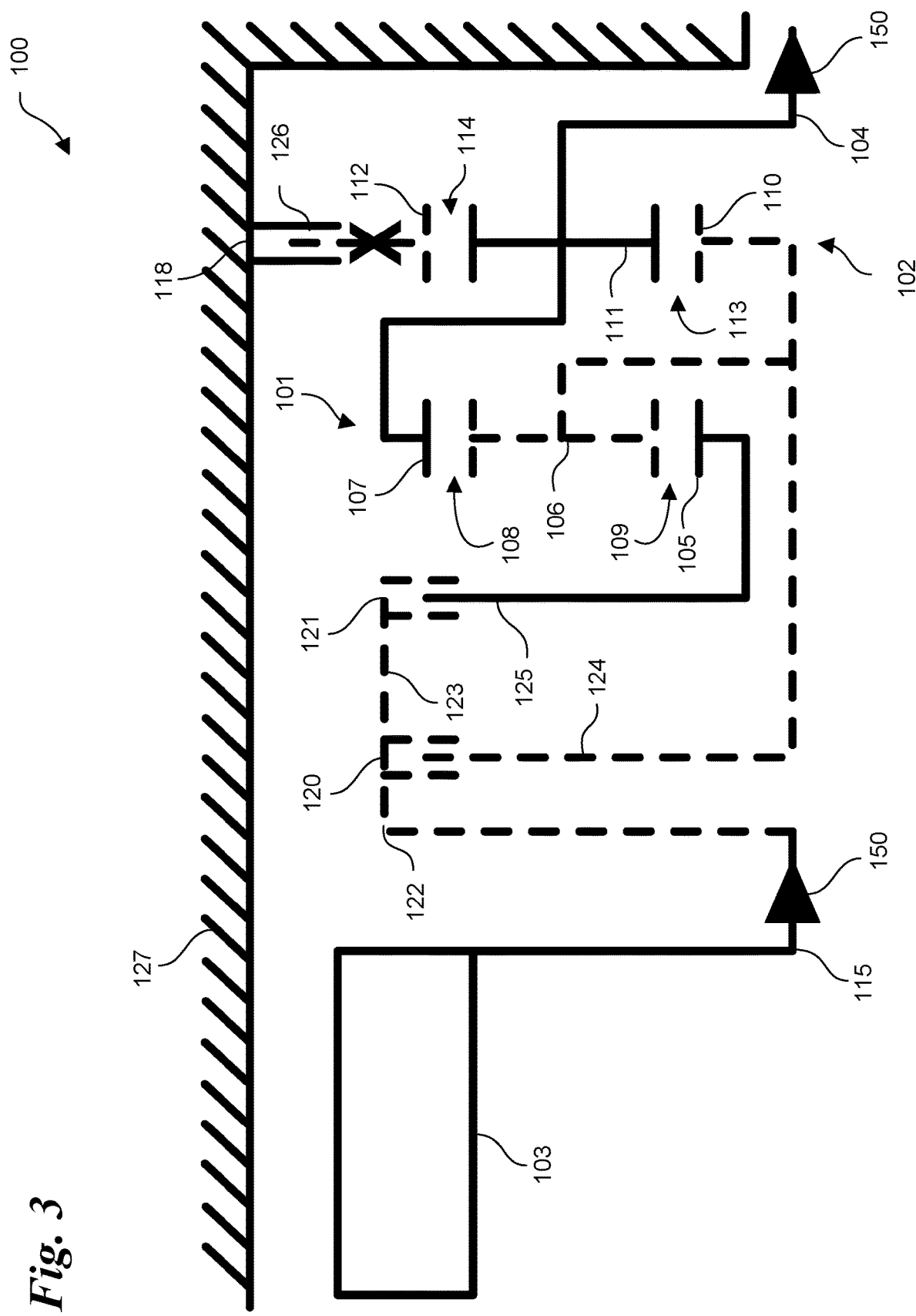
FIG. 3 is another schematic diagram illustrating the example of FIG. 1 in operation.
Figure 4:
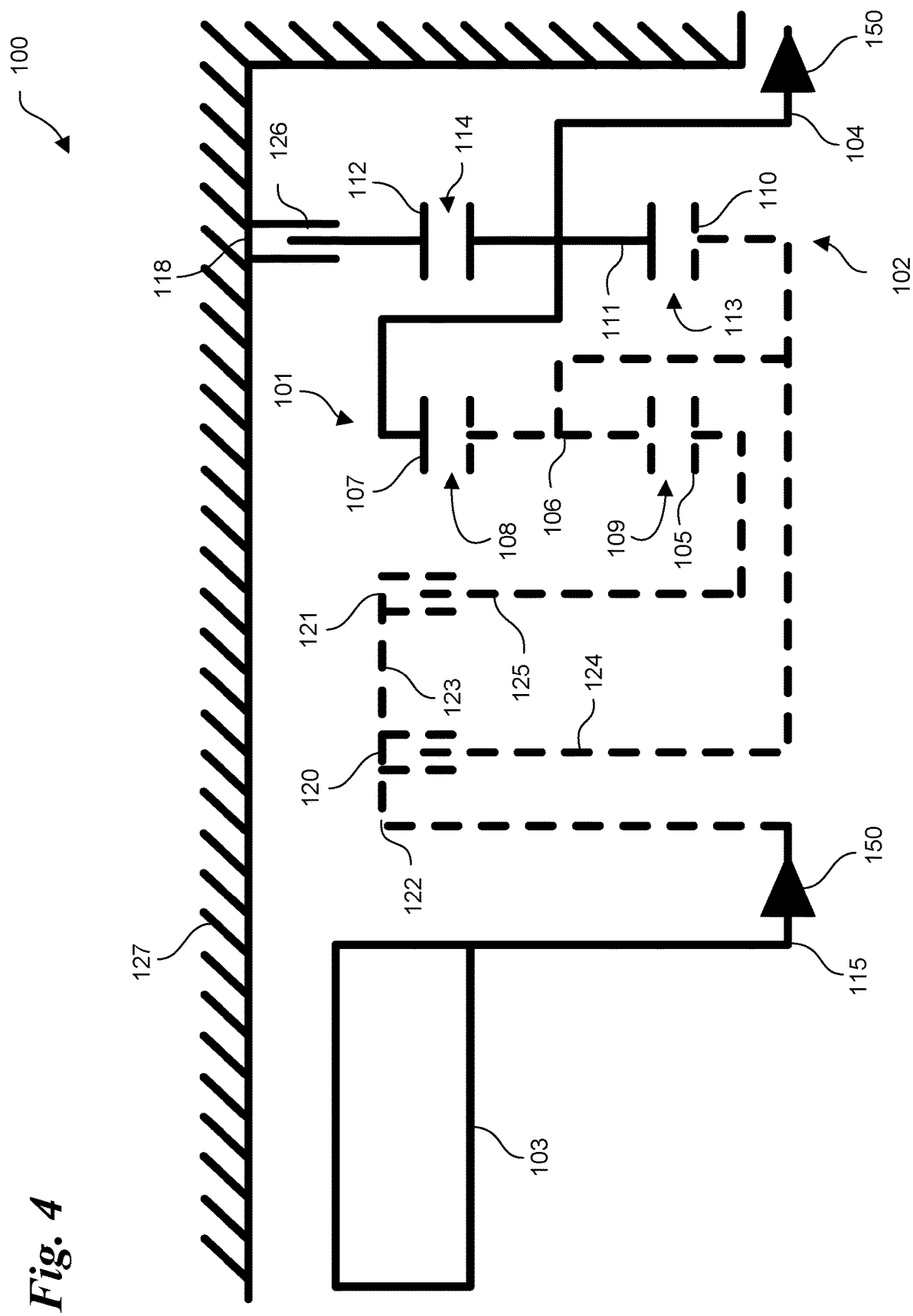
FIG. 4 is another schematic diagram illustrating the example of FIG. 1 in operation.

Examples of the concepts disclosed in FIG. 1 are shown in operation in FIGS. 2-4. In these figures, parts indicated with dashed lines are constrained to rotate together, while parts in solid lines rotate independently of each other. Parts marked with an "X" are constrained from rotating and are thus grounded.

In FIG. 2, the second clutch and the brake are actuated without the first clutch. This couples the torque input from the motor to the sun gear of the first planetary gearset. It also couples the ring gear of the second planetary gearset to ground. This means that the ring gear of the second gearset is maintained in place and is not allowed to rotate with respect to the other parts of the transmission. The ring gear and carrier of the first planetary gearset are allowed to naturally rotate with the sun gear and carrier of the second planetary gearsets according to their respective configurations. In this way power can transfer from the electric motor, downstream through the transmission, to the output to provide a first gear ratio.

In FIG. 3, the first clutch is actuated along with the brake, and without actuating the second clutch. This couples the torque input from the motor to the carrier of the first planetary gear set and to the sun gear of the second planetary gearset. This configuration also grounds the ring gear of the second planetary gearset. The carrier of the second planetary gearset thus is naturally driven by the torque input from the carrier of the first gearset and the sun gear of the second gearset to provide output torque on the output shaft. This allows torque to transfer to the output shaft according to a second gear ratio that is different than the first.

In FIG. 4, the first and second clutches are actuated without brake. This couples the torque input from the motor to the carrier and sun gear of the first planetary gear set, and to the sun gear of the second planetary gearset. The carrier of the second planetary gearset is thus driven by the carrier of the first gearset and the sun gear of the second gear set according to their respective configurations. This allows torque to transfer to the output shaft according to the third gear ratio.

Figure 5:
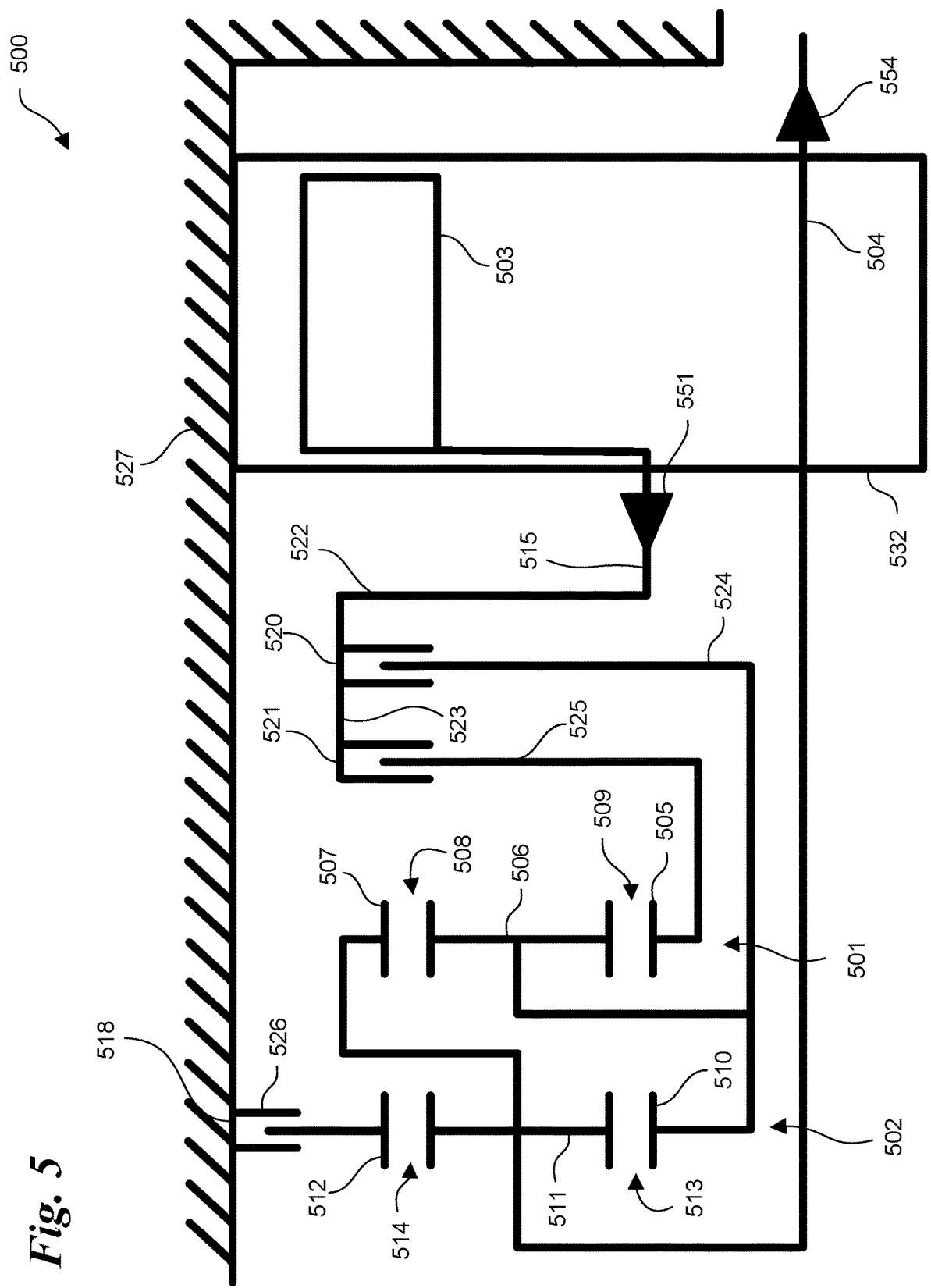
FIG. 5 is a schematic diagram illustrating another example of a drive system of the present disclosure.

Illustrated in FIG. 5 at 500 is another different example of a drive system or drivetrain of the present disclosure where the transmission is upstream of the motor, or put another way, the motor is downstream of the transmission. A first clutch 520 and a second clutch 521 are optionally included and coupled to the drivetrain such that power first flows upstream away from the motor 503 as shown by the arrow 551 toward the first and second clutches. Power is then directed to engage a first planetary gearset 501, and a second planetary gearset 502, before reversing to flow downstream past the motor 503 and to the output shaft 504 in the direction shown at 554.

As illustrated in FIG. 5, the output shaft 504 may be arranged to rotate separately from an input shaft 515. The input shaft 515 and the output shaft 504 may, in one example, be mounted concentrically. For example, output shaft 504 may be mounted inside input shaft 515. Alternatively, input shaft 515 may be mounted inside output shaft 504. In another aspect, the output shaft 504 may pass through a motor housing 532 arranged and configured to contain motor 503. In another aspect, motor housing 532 may be part of housing 527, or in another example, a separate housing that is coupled to housing 527.

The gearset 501 optionally includes a sun gear 505, a carrier 506 to which is mounted one or more planetary gears that are arranged and configured to engage a ring gear 507 at 508, and the sun gear 505 at 509. The gearset 502 optionally includes a sun gear 510, a carrier 511 with one or more planetary gears mounted to it, and a ring gear 512. The planetary gears are arranged and configured to engage the ring gear 512 at 514, and the sun gear 510 at 513.

In another aspect, the carrier 506 of the first planetary gearset 501 is optionally coupled to the sun gear 510 of the second planetary gearset 502. In another aspect, the ring gear 507 of the first planetary gearset 501 is optionally coupled to the carrier 511 of the second planetary gearset 502. In another aspect, the first gearset 501 is upstream of the motor 503, and upstream of the second planetary gearset 502.

An input shaft 515 is coupled to the motor 503 and to the input side 522 of a first clutch 520, and to the input side 523 of a second clutch 521. The first clutch 520 is operable to selectively couple the input shaft 515 to the carrier 506 of the first planetary gearset 501, and optionally to the sun gear 510 of the second planetary gearset 502. The second clutch 521 may be operable to selectively couple the sun gear 505 of the first planetary gearset 501 to the input shaft 515. A brake 526 may be arranged and configured to selectively couple the ring gear 512 of the second planetary gearset 502 to a ground 518. A housing 527 that at least partially surrounds the first and second planetary gearsets may be arranged and configured to operate as the ground 518. In another aspect, the carrier 511 of the second planetary gearset 502 is optionally coupled to an output shaft 504.

In another aspect, the clutch 520 may be operable to selectively couple the input shaft 515 to the carrier 506 of the first gearset 501. In another aspect, the clutch 521 may be operable to selectively couple the input shaft 515 to the sun gear 510 of the second gearset 502. In another aspect, the carrier 506 of the first gearset 501 is optionally coupled to the sun gear 510 of the second gearset 502. By engaging the clutch 520 and 521, the drivetrain may provide a 1:1 gear ratio between the input shaft 515 and the output shaft 504.

The clutch 521 may be operable to selectively couple the input shaft 515 to the sun gear 505 of the first planetary gearset 501. In another aspect, a drive system of the present disclosure is optionally arranged and configured such that the input shaft 515 and the sun gear 505 of the first planetary gearset 501 are coupled to an output side 525 of the clutch 521. The sun gear 510 of the second planetary gearset 502, and the carrier 506 of the first planetary gearset 501 are optionally coupled to an output side 524 of the clutch 520. In another aspect, an input side of clutch 521 is optionally coupled to an input side 522 of the clutch 520. In another aspect, both the input side 522, and the input side 523 of clutches 520 and 521 respectively may be coupled together and may be configured to receive input torque from input shaft 515. In another aspect, the first and second planetary gear sets 501, and 502 optionally define substantially similar gear ratios. In one example, a first gear ratio defined by the first planetary gearset 501 and a second gear ratio defined by the second planetary gearset 502 differ by less than 0.01:1, by less than 0.5:1, or by less than 2:1. For example, gearset 501 may define a gear ratio of 3:1 and gearset 502 may define a gear ratio of 3:1 making the two gear ratios equal. In another example, planetary gearset 501 may define a gear ratio of 4.5:1 and gearset 502 may define a gear ratio of 4.2:1 making the two gear ratios substantially similar and differing by less than 0.5:1.

In another aspect, the drivetrain of the present disclosure is optionally configured to be operated such that first clutch, the second clutch, and the brake may be individually actuated to provide three forward, and the reverse gears. A neutral gear may be provided by disengaging all of the clutches and the brake at the same time. A wide range of gear ratios are available according to the power output available from the electric motor and the sizes of the gears in planetary gear sets.

For example, the drive system of the present disclosure is optionally configured so that first clutch 520, the second clutch 521, and the brake 526 are each engaged separately at different times to provide three separate speed ratios of the input shaft 515 relative to the output shaft 504. Three separate reverse gear ratios are optionally available by reversing the rotation of the electric motor 503. The rotational direction of the input shaft 515 is optionally directly linked to the rotational direction of the output shaft 504 to facilitate the reverse drive capability. In this way the drive system of the present disclosure is simplified to reduce or eliminate the need for a separate reversing mechanism.

In another aspect, the first clutch 520, the second clutch 521, and the brake 526 are optionally individually engaged such that only two of the three may be engaged at any time, and when in neutral, none of them are engaged. For example, engaging the second clutch 521 and the brake 526 optionally provides a first gear ratio of the three separate speed ratios (input shaft 515 to output shaft 504) that is greater than 2:1, greater than 4.3:1, greater than 12:1, or more. These gear ratios may be achieved in the forward or reverse direction, with the reverse direction achieved by rotating the electric motor 503 in the opposite direction. In one more specific example, the first gear speed ratio is about 6.6:1.

A second gear may be achieved by the drive system of the present disclosure by engaging the first clutch 520, and the brake 526. This may provide a second gear ratio of the three separate speed ratios that is greater than 1.5:1, greater than 2:1, greater than 3.5:1, greater than 4:1, or more. Any suitable gear ratio may be used for second gear. Second gear ratios may be achieved in the forward or reverse direction by rotating the motor 503 in either the forward or reverse direction. In one more specific example, the second gear speed ratio is about 2.65:1.

The drive system of the present disclosure may achieve a third gear ratio by engaging the first clutch 520 and the second clutch 521 while the brake 526 is disengaged. Thus a 1:1 gear ratio may be obtained. Other gears may be included as well in the drive system rendering a third gear ratio of the three separate speed ratios that is less than or equal to 0.5:1, greater than 0.5:1, greater than 1:1, greater than 1.5:1, or more. Any suitable gear ratio may be used for third gear. Third gear ratios may be achieved in either a forward or a reverse driving mode by rotating the motor 503 in either the forward or reverse direction while the first and second clutches are engaged. In one more specific example, the third gear speed ratio is about 1:1 thus providing a direct drive from the electric motor 503 to the output shaft 504.

A first gear may be defined by engaging the second clutch 521 and the brake 526. A second gear may be defined by engaging the first clutch 521 and the brake 526. A third gear may be defined by engaging the first clutch 520 and the second clutch 521. In another aspect, the drivetrains of the present disclosure may define first, second, and third gears by engaging two of the first and second clutches and the brake together at different times to provide three separate speed ratios of the input shaft relative to the output shaft.

The drive system is optionally configured to shift between gear ratios by inverting the engagement state of two of the first and second clutches and the brake while maintaining the remaining first or second clutch or brake in an engaged state. For example, looking at the table above, clutch 520 is disengaged in first gear, while clutches 521 and brake 526 are engaged. When shifting to second gear, the engagement state of clutch 520 and clutch 521 are inverted from disengaged to engaged, while the engagement state of brake 526 remains unchanged. When shifting from second gear to third gear, once again, the engagement state two of the elements is inverted while the remaining element remains unchanged. Clutch 521 inverts from an unengaged state to an engaged state, while the brake 526 changes from engaged state to an unengaged state. Clutch 520 remains engaged. Thus, the transmission of the present disclosure is operable to shift gears with only one off going clutch or brake, and one oncoming clutch or brake thus avoiding a double transition shift.

In another aspect, the first clutch 520, the second clutch 521, the brake 526 may be optionally implemented with one or more frictional elements selectively placed in contact with one another. First clutch 520 may include multiple sets of frictional elements that are rotatable and are interspersed between each other. One set may be coupled to the input side 522 where power is received from motor 503, while the other set of frictional elements may be coupled to the output side 524 of the clutch from which downstream components receive torque passed through from the input side. By selectively applying a compression force to the multiple sets of frictional components, the input side 522 and the output side 524 may be held stationary with respect to each other while the compression force is maintained. This allows torque applied to the input side 522 (such as from the motor 503) to be selectively transmitted to the output side 524 and anything coupled to it according to the compression applied by the clutch 520. It may thus be said that clutch 520 is "engaged" or "activated" when a compression force is applied to the frictional components. Clutch 520 may be thought of as "fully engaged" when the relative movement of the input side 522 to the output side 524 is insignificantly small or substantially zero.

Second clutch 521 may operate similarly to clutch 520 and include multiple sets of frictional elements that are rotatable and are interspersed between each other. One set may be coupled to the input side 523 where power is received from motor 503, while the other set of frictional elements may be coupled to the output side 525 of the clutch. By selectively applying a compression force to the multiple sets of frictional components, the input side 523 and the output side 525 may be held stationary with respect to each other while the compression force is maintained. This allows torque applied to the input side 523 to be selectively transmitted to the output side 525 and thus two other elements of the drivetrain coupled to it according to the compression applied by the clutch 521. It may thus be said that clutch 521 is "engaged" or "activated" when a compression force is applied to the frictional components of the clutch. Clutch 521 may be thought of as "fully engaged" when the relative movement of the input side 523 to the output side 525 is insignificantly small or substantially zero.

Brake 526 may include a friction braking system with one or more rotatable braking components interspersed between one or more stationary braking components. By selectively applying a compression force to the braking components, the rotating components may be pressed against the stationary components until the rotation is brought to a complete stop thus "grounding" the rotating portion of the braking assembly to the stationary components while the compression force is maintained. It may thus be said that brake 526 is "engaged" or "activated" when a compression force is applied to the braking components. Brake 526 may be thought of as "fully engaged" when the relative movement of the stationary braking components to the rotatable components is insignificantly small or substantially zero.

In another aspect, first clutch 520, second clutch 521, or brake 526 may include one or more dog clutches or synchronizers having rotating components that engage by interference or clearance fit thus reducing or eliminating the opportunity for slip. A dog clutch configuration may be useable either in place of the frictional components described for the components 520, 521, and/or 526 above, or along with them.

Figure 6:
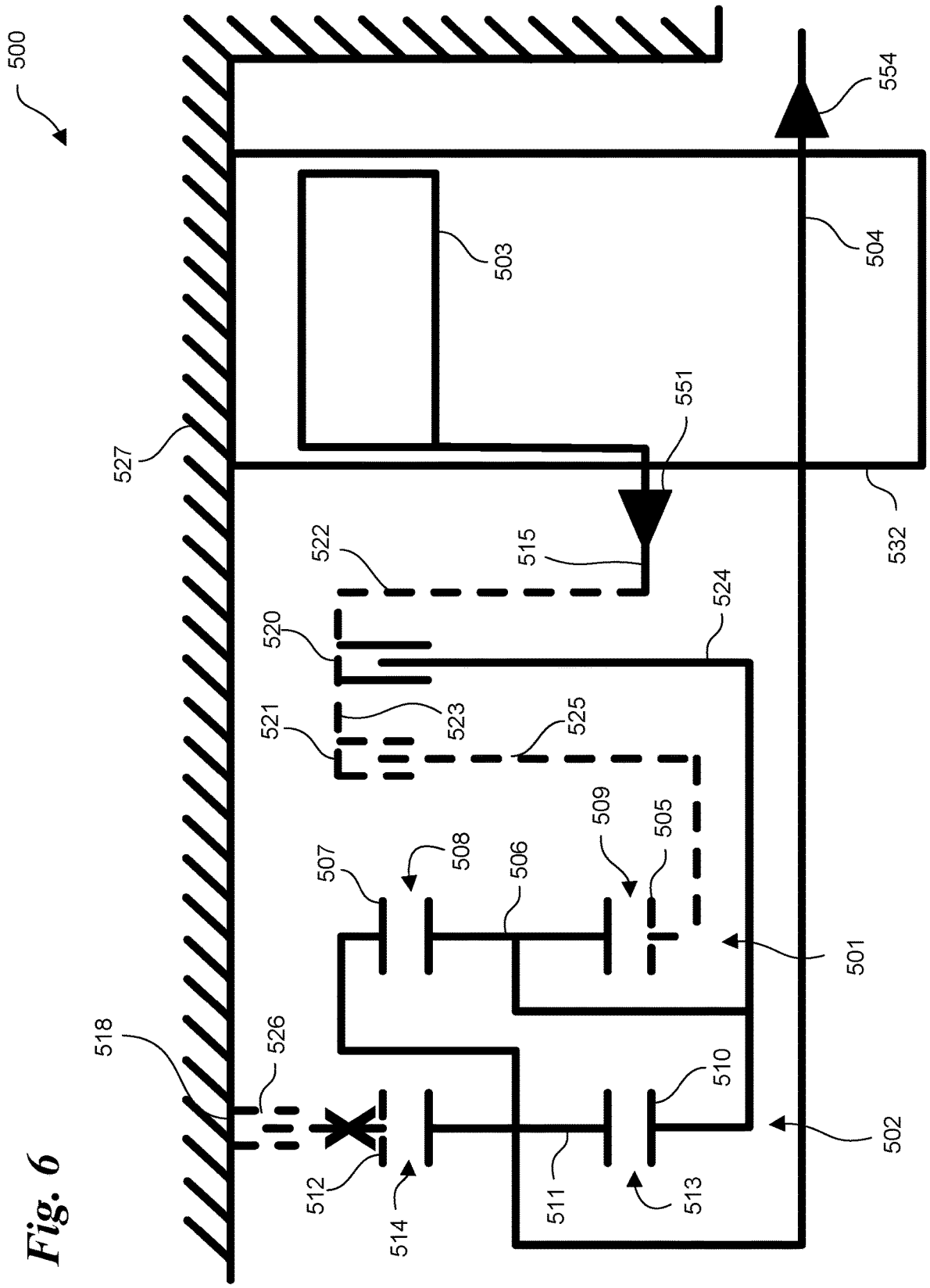
FIG. 6 is a schematic diagram illustrating the example of FIG. 5 in operation.
Figure 7:
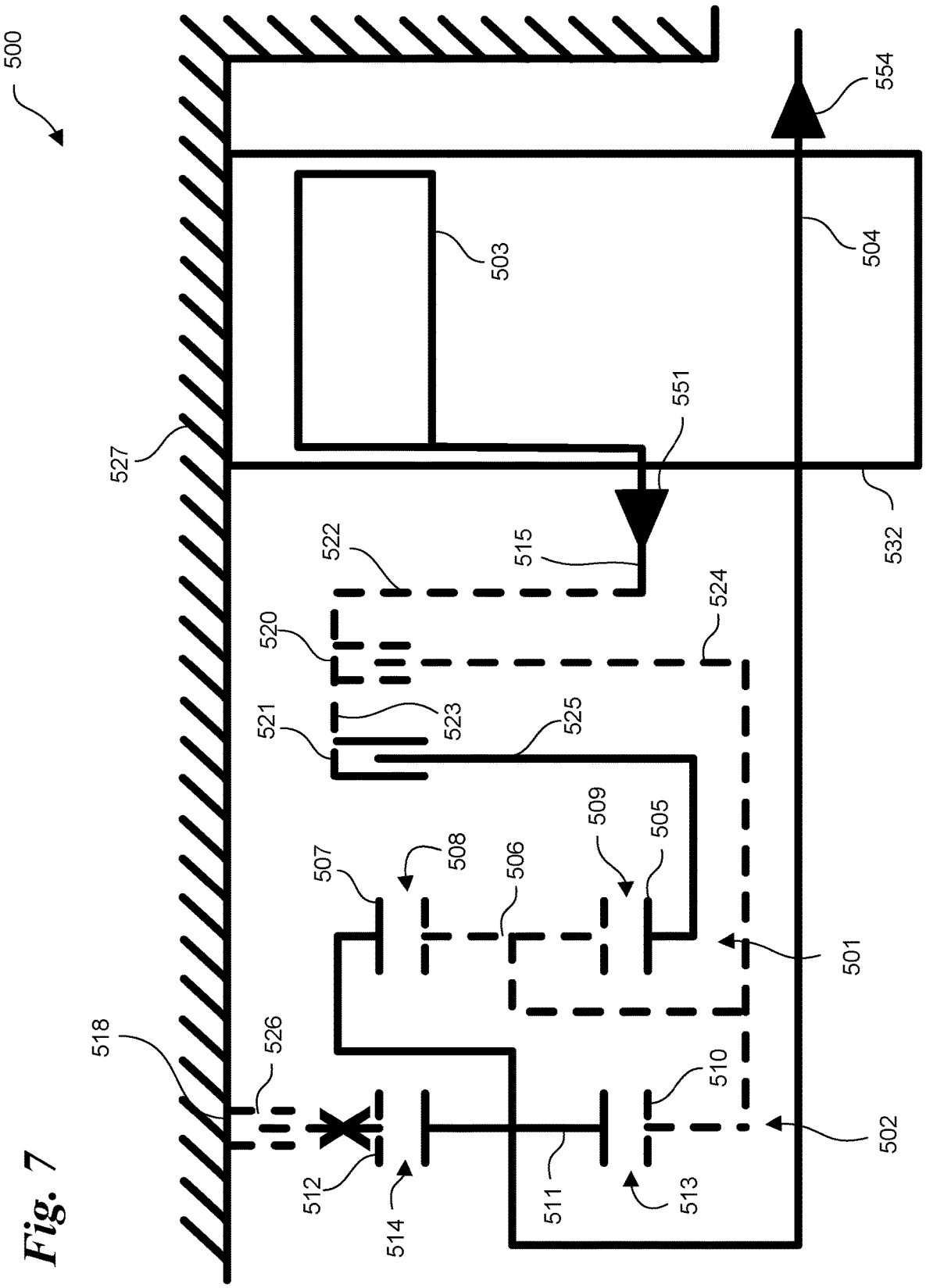
FIG. 7 is another schematic diagram illustrating the example of FIG. 5 in operation.
Figure 8:
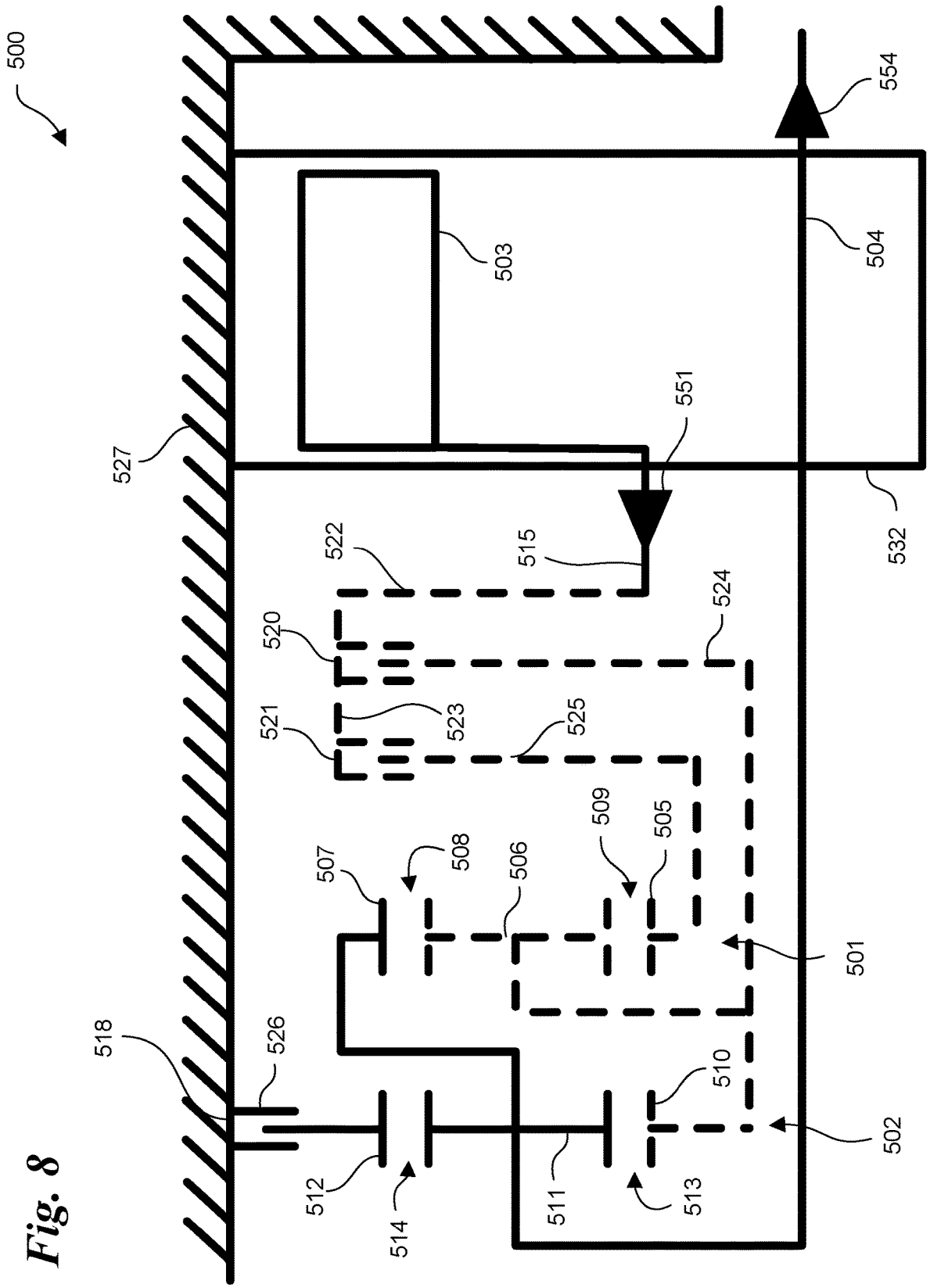
FIG. 8 is another schematic diagram illustrating the example of FIG. 5 in operation.

Examples of the arrangement disclosed in FIG. 5 are shown in operation in FIGS. 6-8. In these figures, parts indicated with dashed lines are constrained to rotate together, while parts in solid lines rotate independently of each other. Parts marked with an "X" are constrained from rotating and are thus grounded.

In FIG. 6, the second clutch and the brake are actuated without the first clutch. This couples the torque input from the motor to the sun gear of the first planetary gearset. It also couples the ring gear of the second planetary gearset to ground. This means that the ring gear of the second gearset is maintained in place and is not allowed to rotate with respect to the other parts of the transmission. The ring gear and carrier of the first planetary gearset are allowed to rotate naturally with the sun gear and carrier of the second planetary gearsets according to their respective configurations. In this way power can transfer from the electric motor, downstream through the transmission, to the output to provide a first gear ratio.

In FIG. 7, the first clutch is actuated along with the brake, and without actuating the second clutch. This couples the torque input from the motor to the carrier of the first planetary gear set and to the sun gear of the second planetary gearset. This configuration also grounds the ring gear of the second planetary gearset. The carrier of the second planetary gearset thus is driven by the torque input from the carrier of the first gearset and the sun gear of the second gearset to provide output torque on the output shaft. This allows torque to transfer to the output shaft according to a second gear ratio that is different than the first.

In FIG. 8, the first and second clutches are actuated without brake. This couples the torque input from the motor to the carrier and sun gear of the first planetary gear set, and to the sun gear of the second planetary gearset. The carrier of the second planetary gearset is thus driven by the carrier of the first gearset and the sun gear of the second gear set according to their respective configurations. This allows torque to transfer to the output shaft according to the third gear ratio.

Figure 9:
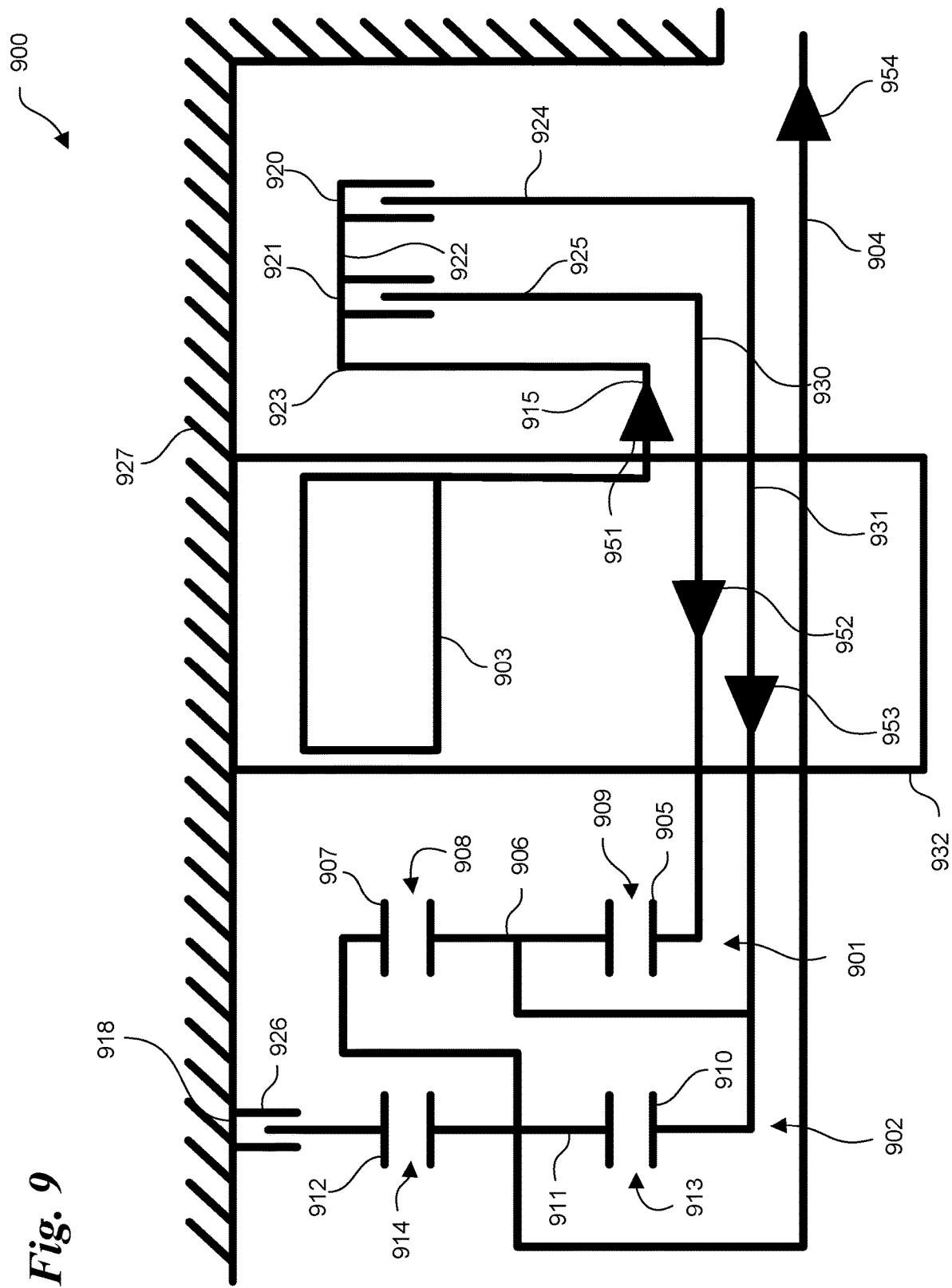
FIG. 9 is a schematic diagram illustrating another example of the components and configuration of a drive system of the present disclosure.

Illustrated in FIG. 9 at 900 is another different example of a drive system or drivetrain of the present disclosure where the motor is downstream of at least a portion of the transmission, or put differently, at least a portion of the transmission is upstream of the motor.

In this example at 900, a "split" or "divided" configuration is shown that includes a portions of the drive train components upstream of the motor, and a second different portion of the drive train components positioned downstream of the motor 903. However, this example is illustrative rather than restrictive, and illustrates that some or all of the disclosed transmission components may be upstream of the motor, downstream of the motor, or any combination thereof.

In FIG. 9, a first clutch 920 and a second clutch 921 are optionally included and coupled to the drivetrain such that power first flows downstream away from the motor 903 as shown by the arrow 951 toward the first and second clutches. Power is then directed according to arrows 952 and 953 upstream away from the output shaft 904 to engage a first planetary gearset 901, and a second planetary gearset 902, before reversing again to flow downstream past the motor 903 and to the output shaft 904 in the direction shown at 954. In this example, planetary gearsets 901 and 902 are upstream of the motor 903, while other transmission components such as clutches 920 and 921 are downstream of the motor 903.

As illustrated in FIG. 9, the output shaft 904 may be arranged to rotate separately from one or more intermediate shafts 930 and/or 931 arranged and configured to carry power upstream to the planetary gearsets 901 and 902. The input shaft 915, the intermediate shafts 930 and 931 and the output shaft 904 may, in one example, be mounted concentrically. For example, output shaft 904 may be mounted inside intermediate shaft 931, which may in turn be mounted inside intermediate shaft 930, which may be mounted within input shaft 915. This is but one possible arrangement as these shafts may be mounted concentrically in any suitable arrangement. In another aspect, the shafts 930, 931, and 904 may pass through a motor housing 932 arranged and configured to contain motor 903. In another aspect, motor housing 932 may be part of housing 927, or in another example, a separate housing that is coupled to housing 927.

The gearset 901 optionally includes a sun gear 905, a carrier 906 to which is mounted one or more planetary gears that are arranged and configured to engage a ring gear 907 at 908, and the sun gear 905 at 909. The gearset 902 optionally includes a sun gear 910, a carrier 911 with one or more planetary gears mounted to it, and a ring gear 912. The planetary gears are arranged and configured to engage the ring gear 912 at 914, and the sun gear 910 at 913.

In another aspect, the carrier 906 of the first planetary gearset 901 is optionally coupled to the sun gear 910 of the second planetary gearset 902. In another aspect, the ring gear 907 of the first planetary gearset 901 is optionally coupled to the carrier 911 of the second planetary gearset 902. In another aspect, the first gearset 901 is upstream of the motor 903, and upstream of the second planetary gearset 902.

An input shaft 915 is coupled to the motor 903 and to the input side 922 of a first clutch 920, and to the input side 923 of a second clutch 921. The first clutch 920 is operable to selectively couple the input shaft 915 to the carrier 906 of the first planetary gearset 901, and optionally to the sun gear 910 of the second planetary gearset 902. The second clutch 921 may be operable to selectively couple the sun gear 905 of the first planetary gearset 901 to the input shaft 915. A brake 926 may be arranged and configured to selectively couple the ring gear 912 of the second planetary gearset 902 to a ground 918. A housing 927 that at least partially surrounds the first and second planetary gearsets may be arranged and configured to operate as the ground 918. In another aspect, the carrier 911 of the second planetary gearset 902 is optionally coupled to an output shaft 904.

In another aspect, the clutch 920 may be operable to selectively couple the input shaft 915 to the carrier 906 of the first gearset 901. In another aspect, the clutch 921 may be operable to selectively couple the input shaft 915 to the sun gear 910 of the second gearset 902. In another aspect, the carrier 906 of the first gearset 901 is optionally coupled to the sun gear 910 of the second gearset 902. By engaging the clutch 920 and 921, the drivetrain may provide a 1:1 gear ratio between the input shaft 915 and the output shaft 904.

The clutch 921 may be operable to selectively couple the input shaft 915 to the sun gear 905 of the first planetary gearset 901. In another aspect, a drive system of the present disclosure is optionally arranged and configured such that the input shaft 915 and the sun gear 905 of the first planetary gearset 901 are coupled to an output side 925 of the clutch 921. The sun gear 910 of the second planetary gearset 902, and the carrier 906 of the first planetary gearset 901 are optionally coupled to an output side 924 of the clutch 920.

In another aspect, an input side of clutch 921 is optionally coupled to an input side 922 of the clutch 920. In another aspect, both the input side 922, and the input side 923 of clutches 920 and 921 respectively may be coupled together and may be configured to receive input torque from input shaft 915. In another aspect, the first and second planetary gear sets 901, and 902 optionally define substantially similar gear ratios. In one example, a first gear ratio defined by the first planetary gearset 901 and a second gear ratio defined by the second planetary gearset 902 differ by less than 0.01:1, by less than 0.5:1, or by less than 2:1. For example, gearset 901 may define a gear ratio of 3:1 and gearset 902 may define a gear ratio of 3:1 making the two gear ratios equal. In another example, planetary gearset 901 may define a gear ratio of 4.5:1 and gearset 902 may define a gear ratio of 4.2:1 making the two gear ratios substantially similar and differing by less than 0.5:1.

In another aspect, the drivetrain of the present disclosure is optionally configured to be operated such that first clutch, the second clutch, and the brake may be individually actuated to provide three forward, and the reverse gears. A neutral gear may be provided by disengaging all of the clutches and the brake at the same time. A wide range of gear ratios are available according to the power output available from the electric motor and the sizes of the gears in planetary gear sets.

For example, the drive system of the present disclosure is optionally configured so that first clutch 920, the second clutch 921, and the brake 926 are each engaged separately at different times to provide three separate speed ratios of the input shaft 915 relative to the output shaft 904. Three separate reverse gear ratios are optionally available by reversing the rotation of the electric motor 903. The rotational direction of the input shaft 915 is optionally directly linked to the rotational direction of the output shaft 904 to facilitate the reverse drive capability. In this way the drive system of the present disclosure is simplified to reduce or eliminate the need for a separate reversing mechanism.

In another aspect, the first clutch 920, the second clutch 921, and the brake 926 are optionally individually engaged such that only two of the three may be engaged at any time, and when in neutral, none of them are engaged. For example, engaging the second clutch 921 and the brake 926 optionally provides a first gear ratio of the three separate speed ratios (input shaft 915 to output shaft 904) that is greater than 2:1, greater than 4.3:1, greater than 12:1, or more. These gear ratios may be achieved in the forward or reverse direction, with the reverse direction achieved by rotating the electric motor 903 in the opposite direction. In one more specific example, the first gear speed ratio is about 6.6:1.

A second gear may be achieved by the drive system of the present disclosure by engaging the first clutch 920, and the brake 926. This may provide a second gear ratio of the three separate speed ratios that is greater than 1.5:1, greater than 2:1, greater than 3.5:1, greater than 4:1, or more. Any suitable gear ratio may be used for second gear. Second gear ratios may be achieved in the forward or reverse direction by rotating the motor 903 in either the forward or reverse direction. In one more specific example, the second gear speed ratio is about 2.65:1.

The drive system of the present disclosure may achieve a third gear ratio by engaging the first clutch 920 and the second clutch 921 while the brake 926 is disengaged. Thus a 1:1 gear ratio may be obtained. Other gears may be included as well in the drive system rendering a third gear ratio of the three separate speed ratios that is less than or equal to 0.5:1, greater than 0.5:1, greater than 1:1, greater than 1.5:1, or more. Any suitable gear ratio may be used for third gear. Third gear ratios may be achieved in either a forward or a reverse driving mode by rotating the motor 903 in either the forward or reverse direction while the first and second clutches are engaged. In one more specific example, the third gear speed ratio is about 1:1 thus providing a direct drive from the electric motor 903 to the output shaft 904.

A first gear may be defined by engaging the second clutch 921 and the brake 926. A second gear may be defined by engaging the first clutch 921 and the brake 926. A third gear may be defined by engaging the first clutch 920 and the second clutch 921. In another aspect, the drivetrains of the present disclosure may define first, second, and third gears by engaging two of the first and second clutches and the brake together at different times to provide three separate speed ratios of the input shaft relative to the output shaft.

The drive system is optionally configured to shift between gear ratios by inverting the engagement state of two of the first and second clutches and the brake while maintaining the remaining first or second clutch or brake in an engaged state. For example, looking at the table above, clutch 920 is disengaged in first gear, while clutches 921 and brake 926 are engaged. When shifting to second gear, the engagement state of clutch 920 and clutch 921 are inverted from disengaged to engaged, while the engagement state of brake 926 remains unchanged. When shifting from second gear to third gear, once again, the engagement state two of the elements is inverted while the remaining element remains unchanged. Clutch 921 inverts from an unengaged state to an engaged state, while the brake 926 changes from engaged state to an unengaged state. Clutch 920 remains engaged. Thus, the transmission of the present disclosure is operable to shift gears with only one off going clutch or brake, and one oncoming clutch or brake thus avoiding a double transition shift.

In another aspect, the first clutch 920, the second clutch 921, the brake 926 may be optionally implemented with one or more frictional elements selectively placed in contact with one another. First clutch 920 may include multiple sets of frictional elements that are rotatable and are interspersed between each other. One set may be coupled to the input side 922 where power is received from motor 903, while the other set of frictional elements may be coupled to the output side 924 of the clutch from which downstream components receive torque passed through from the input side. By selectively applying a compression force to the multiple sets of frictional components, the input side 922 and the output side 924 may be held stationary with respect to each other while the compression force is maintained. This allows torque applied to the input side 922 (such as from the motor 903) to be selectively transmitted to the output side 924 and anything coupled to it according to the compression applied by the clutch 920. It may thus be said that clutch 920 is "engaged" or "activated" when a compression force is applied to the frictional components. Clutch 920 may be thought of as "fully engaged" when the relative movement of the input side 922 to the output side 924 is insignificantly small or substantially zero.

Second clutch 921 may operate similarly to clutch 920 and include multiple sets of frictional elements that are rotatable and are interspersed between each other. One set may be coupled to the input side 923 where power is received from motor 903, while the other set of frictional elements may be coupled to the output side 925 of the clutch. By selectively applying a compression force to the multiple sets of frictional components, the input side 923 and the output side 925 may be held stationary with respect to each other while the compression force is maintained. This allows torque applied to the input side 923 to be selectively transmitted to the output side 925 and thus two other elements of the drivetrain coupled to it according to the compression applied by the clutch 921. It may thus be said that clutch 921 is "engaged" or "activated" when a compression force is applied to the frictional components of the clutch. Clutch 921 may be thought of as "fully engaged" when the relative movement of the input side 923 to the output side 925 is insignificantly small or substantially zero.

Brake 926 may include a friction braking system with one or more rotatable braking components interspersed between one or more stationary braking components. By selectively applying a compression force to the braking components, the rotating components may be pressed against the stationary components until the rotation is brought to a complete stop thus "grounding" the rotating portion of the braking assembly to the stationary components while the compression force is maintained. It may thus be said that brake 926 is "engaged" or "activated" when a compression force is applied to the braking components. Brake 926 may be thought of as "fully engaged" when the relative movement of the stationary braking components to the rotatable components is insignificantly small or substantially zero.

In another aspect, first clutch 920, second clutch 921, or brake 926 may include one or more dog clutches or synchronizers having rotating components that engage by interference or clearance fit thus reducing or eliminating the opportunity for slip. A dog clutch configuration may be useable either in place of the frictional components described for the components 920, 921, and/or 926 above, or along with them.

FIG. 9 illustrates one "split" or "divided" arrangement, but this is provided only as an illustration. The drive train components are optionally divided in other ways, and the present figures and description are therefore not limiting in this respect. For example, one planetary gearset and one clutch may be upstream of the motor, and another planetary gearset and another clutch may downstream of the motor. In another example, the clutches may be upstream of the motor, and the planetary gearsets downstream of the motor. In another example, the clutches and one gearset may be upstream of the motor, while another planetary gearset may be downstream of the motor. In yet another example, the planetary gearsets and one clutch may be downstream of the motor, while another clutch may be upstream of the motor. Any suitable "divided" configuration may be useful in the transmission of the present disclosure.

Figure 10:
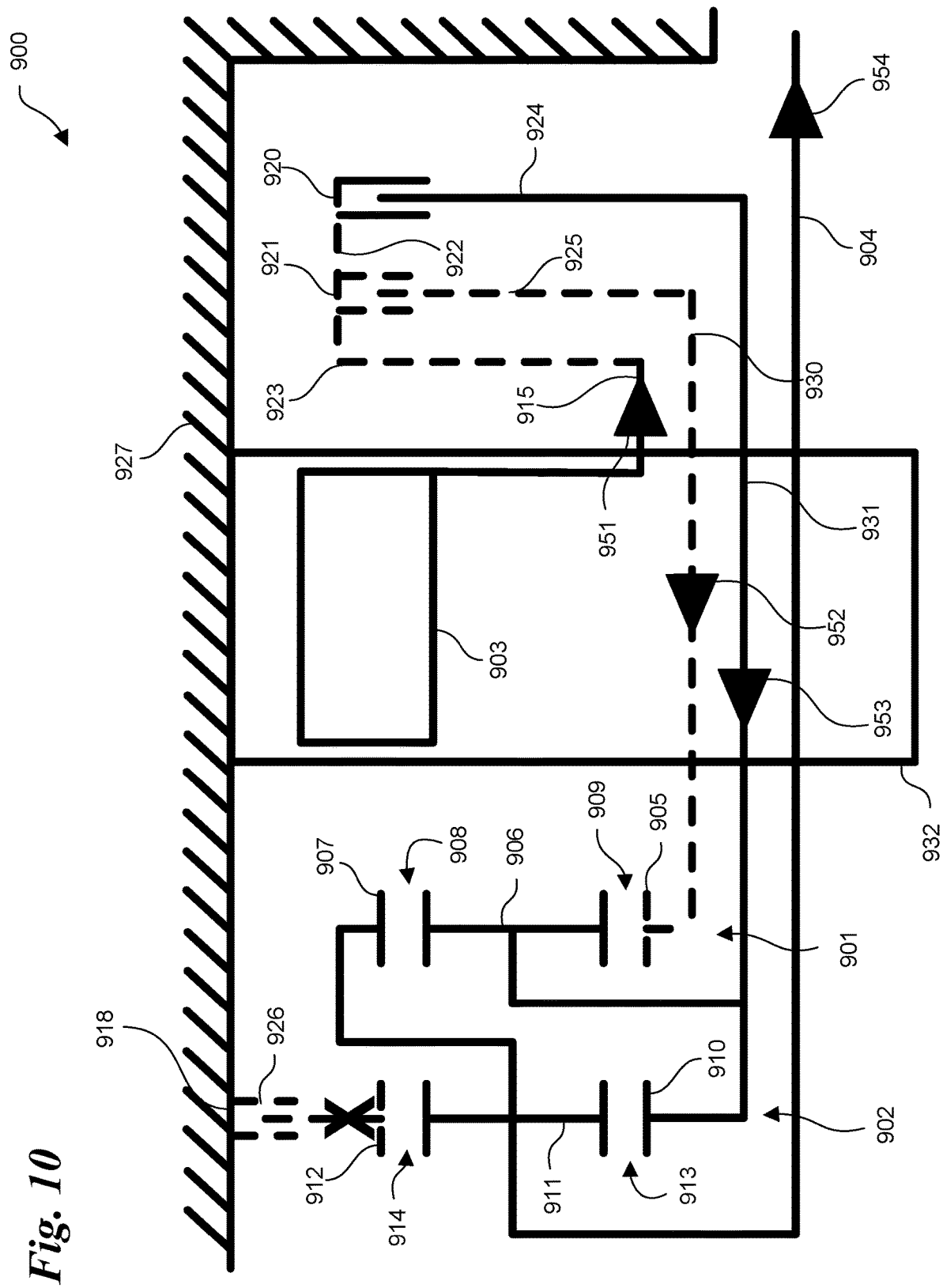
FIG. 10 is a schematic diagram illustrating the example of FIG. 9 in operation.
Figure 11:
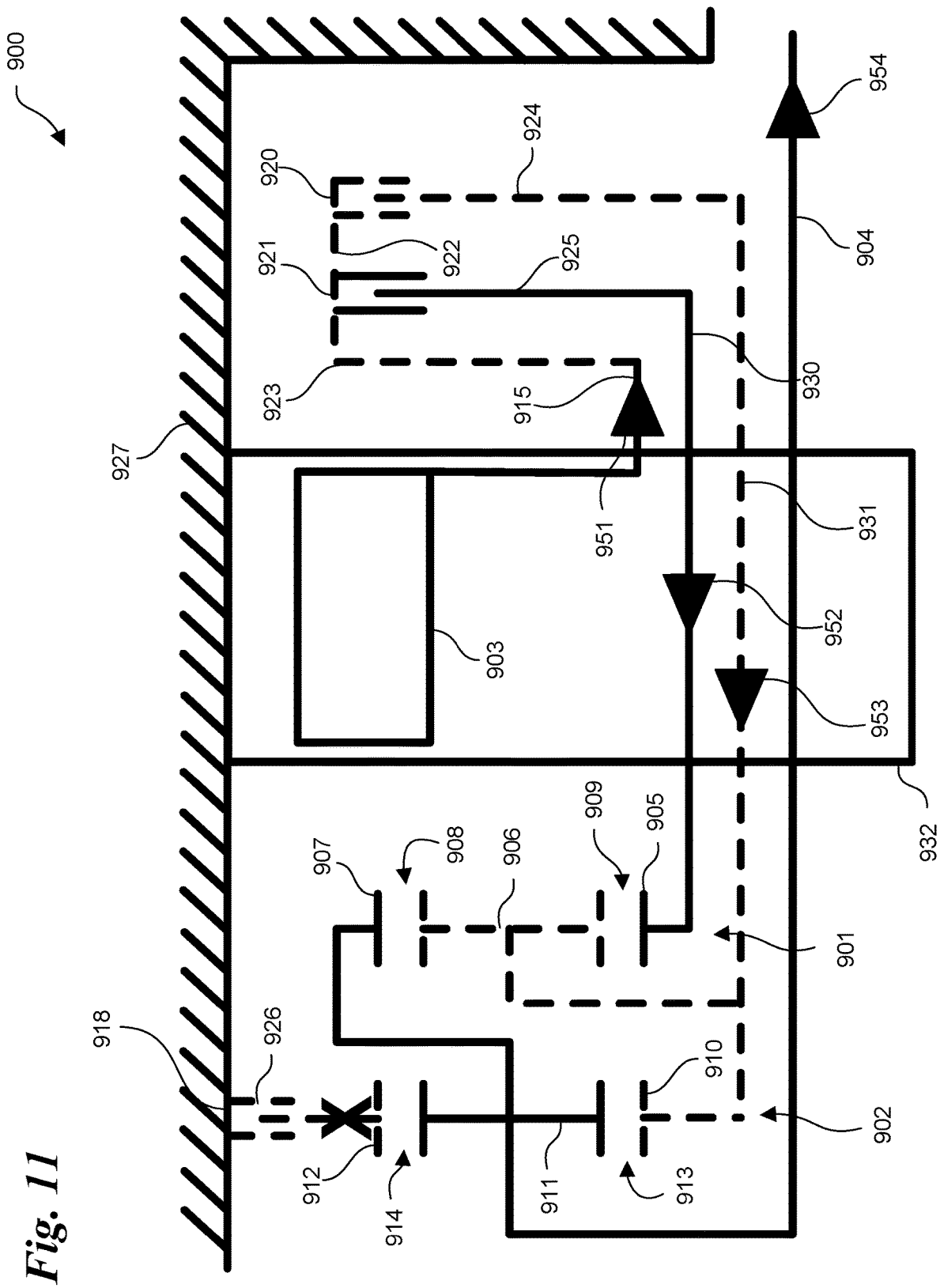
FIG. 11 is another schematic diagram illustrating the example of FIG. 9 in operation.
Figure 12:
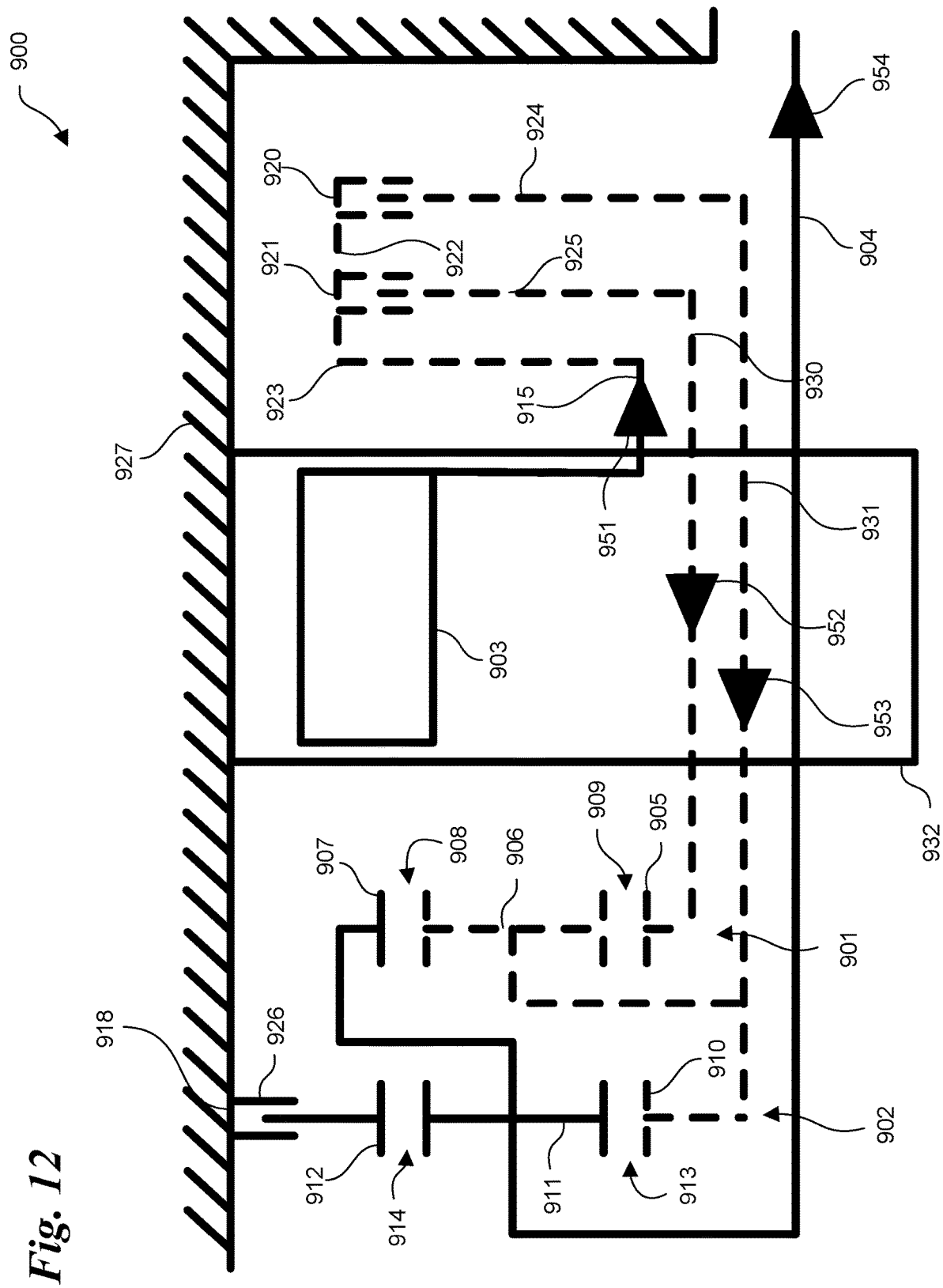
FIG. 12 is another schematic diagram illustrating the example of FIG. 9 in operation.

Examples of the concepts disclosed in FIG. 9 are shown in operation in FIGS. 10-12. In these figures, parts indicated with dashed lines are constrained to rotate together, while parts in solid lines rotate independently of each other. Parts marked with an "X" are constrained from rotating and are thus grounded.

In FIG. 10, the second clutch and the brake are actuated without the first clutch. This couples the torque input from the motor to the sun gear of the first planetary gearset. It also couples the ring gear of the second planetary gearset to ground. This means that the ring gear of the second gearset is maintained in place and is not allowed to rotate with respect to the other parts of the transmission. The ring gear and carrier of the first planetary gearset are allowed to rotate naturally with the sun gear and carrier of the second planetary gearsets according to their respective configurations. In this way power can transfer from the electric motor, downstream through the transmission, to the output to provide a first gear ratio.

In FIG. 11, the first clutch is actuated along with the brake, and without actuating the second clutch. This couples the torque input from the motor to the carrier of the first planetary gear set and to the sun gear of the second planetary gearset. This configuration also grounds the ring gear of the second planetary gearset. The carrier of the second planetary gearset thus is driven by the torque input from the carrier of the first gearset and the sun gear of the second gearset to provide output torque on the output shaft. This allows torque to transfer to the output shaft according to a second gear ratio that is different than the first.

In FIG. 12, the first and second clutches are actuated without brake. This couples the torque input from the motor to the carrier and sun gear of the first planetary gear set, and to the sun gear of the second planetary gearset. The carrier of the second planetary gearset is thus driven by the carrier of the first gearset and the sun gear of the second gear set according to their respective configurations. This allows torque to transfer to the output shaft according to the third gear ratio.

As discussed herein throughout, the drivetrain of the present disclosure is configured to be operated such that first clutch, second clutch, and the brake may be individually actuated in concert to provide three forward, and the reverse gears. A wide range of gear ratios are available according to the power output available from the electric motor and the arrangement of the gears in planetary gear sets.

Figure 13:
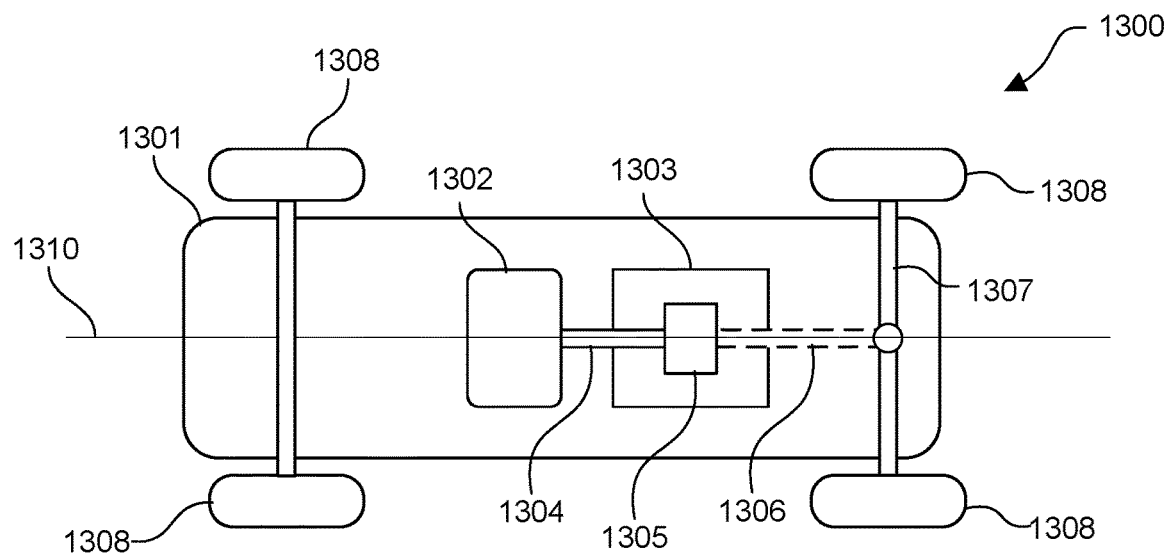
FIG. 13 is a component diagram illustrating another example of the components and configuration of a drive system of the present disclosure.

FIGS. 13-20 illustrate several configurations for a drive system or drivetrain of the present disclosure mounted to a vehicle. In FIG. 13 at 1300, a vehicle 1301 is shown that optionally includes an electric motor 1302 which may be arranged and configured to provide torque to a transmission 1303 via an input shaft 1304. The three speed transmission may include an arrangement of one or more planetary gearsets 1305, and/or any suitable configuration of brakes, clutches, synchronizers, and the like. The gearsets 1305 are optionally configured according to any of the examples discussed in the present disclosure to provide three forward, and three reverse gear ratios. An output shaft 1306 of the transmission may be coupled to the gearsets 1305 according to the present disclosure to optionally provide power to a drive axle 1307. One or more ground engaging members 1308 may be included and may be coupled to the output shaft 1306. These ground engaging members may include, for example, tires, wheels, belts, tracks, and the like, or any combination thereof.

In another aspect, the drive system may be arranged and configured with motor 1302, transmission 1303, and output shaft 1306 aligned axially on a common axis 1310. This common axis 1310 may optionally be perpendicular to the drive axle 1307. In another aspect, the input shaft 1304 receiving power from the electric motor 1302 may extend outwardly toward the motor 1302 in a different direction from the output shaft 1306 which may extend outwardly away from the transmission and toward the drive axle. For example, the input shaft 1304 and the output shaft 1306 may extend out from the transmission 1303 in opposite directions.

In another aspect, the transmission 1303 and gearsets 1305 may be mounted downstream of the motor. Power optionally flows downstream from the motor 1302 through the input shaft and into the transmission 1303 where it may then transfer through the gearsets 1305 and to the output shaft 1306. Power may then continue through the output shaft 1306 downstream to the drive axle 1307, and eventually to the ground engaging members 1308.

Figure 14:
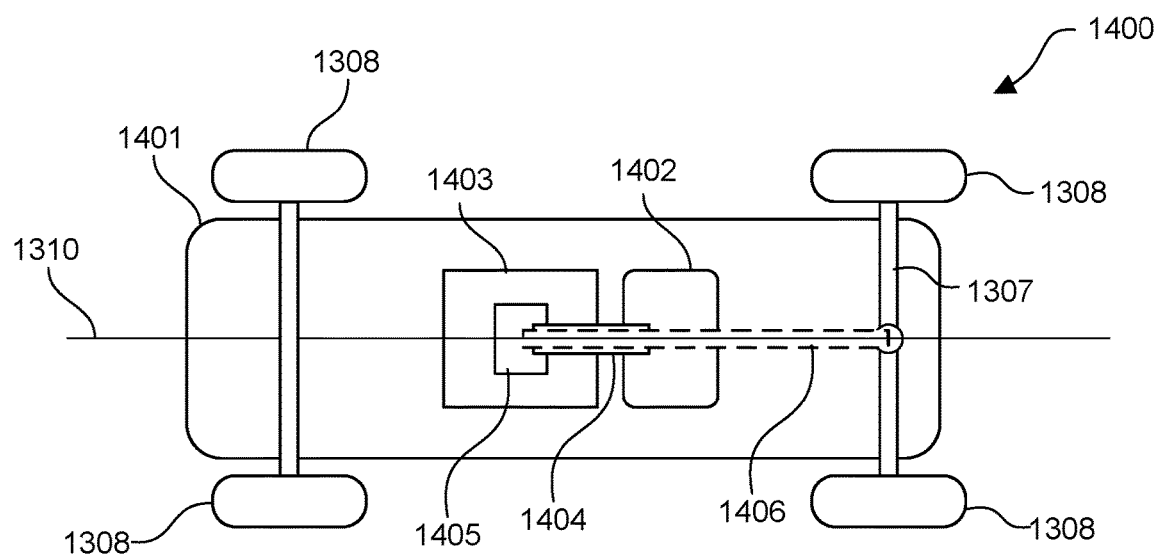
FIG. 14 is a component diagram illustrating another example of the components and configuration of a drive system of the present disclosure.

FIG. 14 illustrates at 1400, another example of a vehicle 1401 that is like the vehicles of the preceding figures but with a different drive train arrangement. Vehicle 1401 optionally includes an electric motor 1402 which may be arranged and configured to provide torque to a transmission 1403 via an input shaft 1404. The three speed transmission may include an arrangement of one or more planetary gearsets 1405, and/or any suitable configuration of brakes, clutches, synchronizers, and the like as discussed herein elsewhere. The gearsets 1405 are optionally configured according to the present disclosure to provide three forward, and three reverse gear ratios. An output shaft 1406 of the transmission may be coupled to the gearsets 1405 according to the present disclosure to optionally provide power to a drive axle 1307. One or more ground engaging members 1308 may be included and may be coupled to the output shaft 1306.

In another aspect, the drive system may be arranged and configured so that motor 1402, the transmission 1403, and the output shaft 1406 are aligned axially on a common axis 1410. This common axis 1410 may optionally be perpendicular to the drive axle 1307. In another aspect, the input shaft receiving power from the electric motor 1302 may extend outwardly toward the motor 1402 in the same direction as the output shaft 1406 which may extend outwardly away from the transmission and toward the drive axle. For example, the output shaft 1406 optionally passes through the input shaft 1404 and the electric motor 1402 to engage with the drive axle 1307. In another aspect, the input shaft 1404 may optionally pass through the output shaft 1406 to engage the drive axle 1307.

In another aspect, the transmission 1403 and gearsets 1405 may be mounted upstream of the motor 1402. Power optionally flows from the motor 1402 upstream through the input shaft and into the transmission 1403 where it may then transfer through the gearsets 1405 and to the output shaft 1406. Power may then flow downstream through the output shaft 1406 back through the motor 1402, and to drive axle 1307. The output shaft 1406 thus extends from the transmission 1403 to engage the drive axle 1307, and passes through a central cavity defined by the motor 1402.

Figure 15:
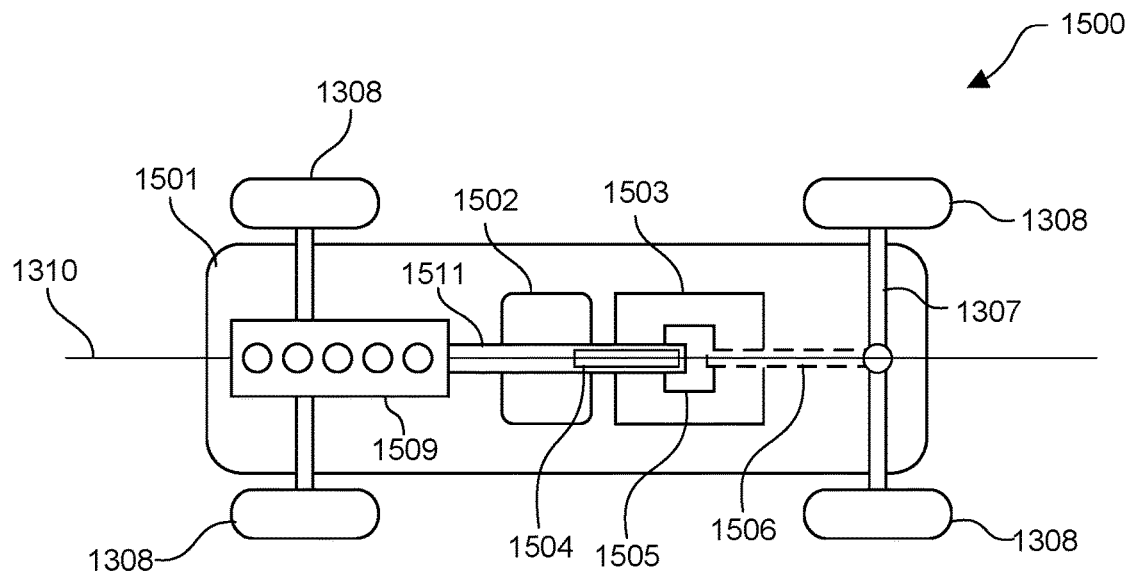
FIG. 15 is a component diagram illustrating another example of the components and configuration of a drive system of the present disclosure.

In FIG. 15 at 1500, a vehicle 1501 is shown that is like the vehicles of the preceding figures. Vehicle 1501 optionally includes an electric motor 1502 which may be arranged and configured to provide torque to a transmission 1503 via an input shaft 1504. Vehicle 1501 also includes an internal combustion engine 1509 which is arranged and configured to provide power to the transmission 1503 via a second input shaft 1511. In this configuration, motor 1502 and engine 1509 comprise a hybrid vehicle drive system that uses a transmission 1503 of the present disclosure.

The three speed transmission may include an arrangement of one or more planetary gearsets 1505, and/or any suitable configuration of brakes, clutches, synchronizers, and the like as discussed herein throughout. The gearsets 1505 are optionally configured according to the present disclosure to provide three forward, and three reverse gear ratios. An output shaft 1506 of the transmission may be coupled to the gearsets 1505 according to the present disclosure to optionally provide power to a drive axle 1307. The power delivered by the transmission 1503 may include power provided by the internal combustion engine 1509, the electric motor 1502, or any combination thereof. One or more ground engaging members 1308 may be included and may be coupled to the output shaft 1306.

In another aspect, the drive system may be arranged and configured so that motor 1502, the transmission 1503, and the output shaft 1506 are aligned axially on a common axis 1310. This common axis 1310 may optionally be perpendicular to the drive axle 1307. In another aspect, at least a portion of the input shaft 1504 may be positioned within or adjacent to the input shaft 1511, and these two shafts may be aligned axially on the common axis 1310. In another aspect, the input shaft 1504 receiving power from the electric motor 1502, and/or the input shaft 1511 receiving power from the engine 1509, may extend outwardly from the transmission 1503 in a different direction from the output shaft 1506. The output shaft 1506 may, for example, extend outwardly away from the transmission and toward the drive axle 1307 from a side of transmission 1503 that is opposite shaft 1504 and 1511.

In another aspect, the transmission 1503 and gearsets 1505 may be mounted downstream of the motor. Power optionally flows from the motor 1502 through the input shaft 1504, and/or from engine 1509 through input shaft 1511, and into the transmission 1503 where it may then transfer through the gearsets 1505 and to the output shaft 1506. Power may then continue through the output shaft 1506 downstream to the drive axle 1307, and eventually to the ground engaging members 1308.

Figure 16:
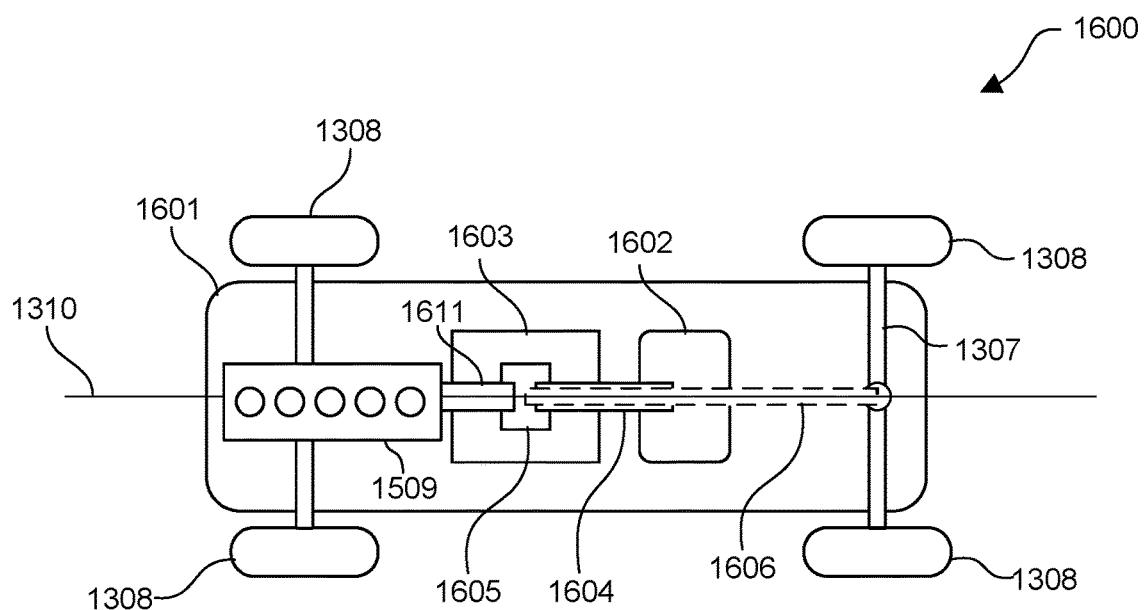
FIG. 16 is a component diagram illustrating another example of the components and configuration of a drive system of the present disclosure.

In FIG. 16 at 1600, a vehicle 1601 is shown that is like the vehicles illustrated in the preceding figures. Vehicle 1601 optionally includes an electric motor 1602 which may be arranged and configured to provide torque to a transmission 1603 via an input shaft 1604. Vehicle 1601 also includes an internal combustion engine 1509 which is arranged and configured to provide power to the transmission 1603 via a second input shaft 1611. In this configuration, motor 1602 and engine 1509 comprise a hybrid vehicle drive system that uses a transmission 1603 of the present disclosure.

The transmission 1603 may include any suitable arrangement of one or more planetary gearsets 1605, and/or any suitable configuration of brakes, clutches, synchronizers, and the like as disclosed herein elsewhere. The gearsets 1605 are optionally configured according to the present disclosure to provide three forward, and three reverse gear ratios. An output shaft 1606 of the transmission may be coupled to the gearsets 1505 according to the present disclosure to optionally provide power to a drive axle 1307. The power delivered by the transmission 1503 may include power provided by the internal combustion engine 1509, the electric motor 1502, or any combination thereof. One or more ground engaging members 1308 may be included and may be coupled to the output shaft 1306.

In another aspect, the drive system may be arranged and configured so that motor 1502, the transmission 1503, and the output shaft 1506 are aligned axially on a common axis 1310. This common axis 1310 may optionally be perpendicular to the drive axle 1307. In another aspect, the input shaft 1604 receiving power from the electric motor 1602 may enter transmission 1603 from a side opposite the input shaft 1611, both of which optionally extend outwardly from the transmission 1603. A portion of the output shaft 1606 may by positioned within the input shaft 1604. The output shaft 1606 may, for example, extend outwardly away from the transmission and toward the drive axle 1307 from a side of transmission 1503 that is opposite 1511.

In another aspect, the transmission 1603 and gearsets 1605 may be mounted upstream of the motor 1602, and optionally downstream from the engine 1509. Power optionally flows from the motor 1602 upstream through the input shaft 1604 and into the transmission 1603 where it may then transfer through the gearsets 1605 and to the output shaft 1606. Power may then flow downstream through the output shaft 1606 back through the motor 1602, and to drive axle 1307. In another aspect, power may flow downstream from engine 1509 via input shaft 1611 to engage the gearsets 1605. Power may then continue downstream to the drive axle 1307 via the output shaft 1606. The output shaft 1606 thus extends from the transmission 1603 to engage the drive axle 1307, and passes through a central cavity defined by the motor 1602.

Figure 17:
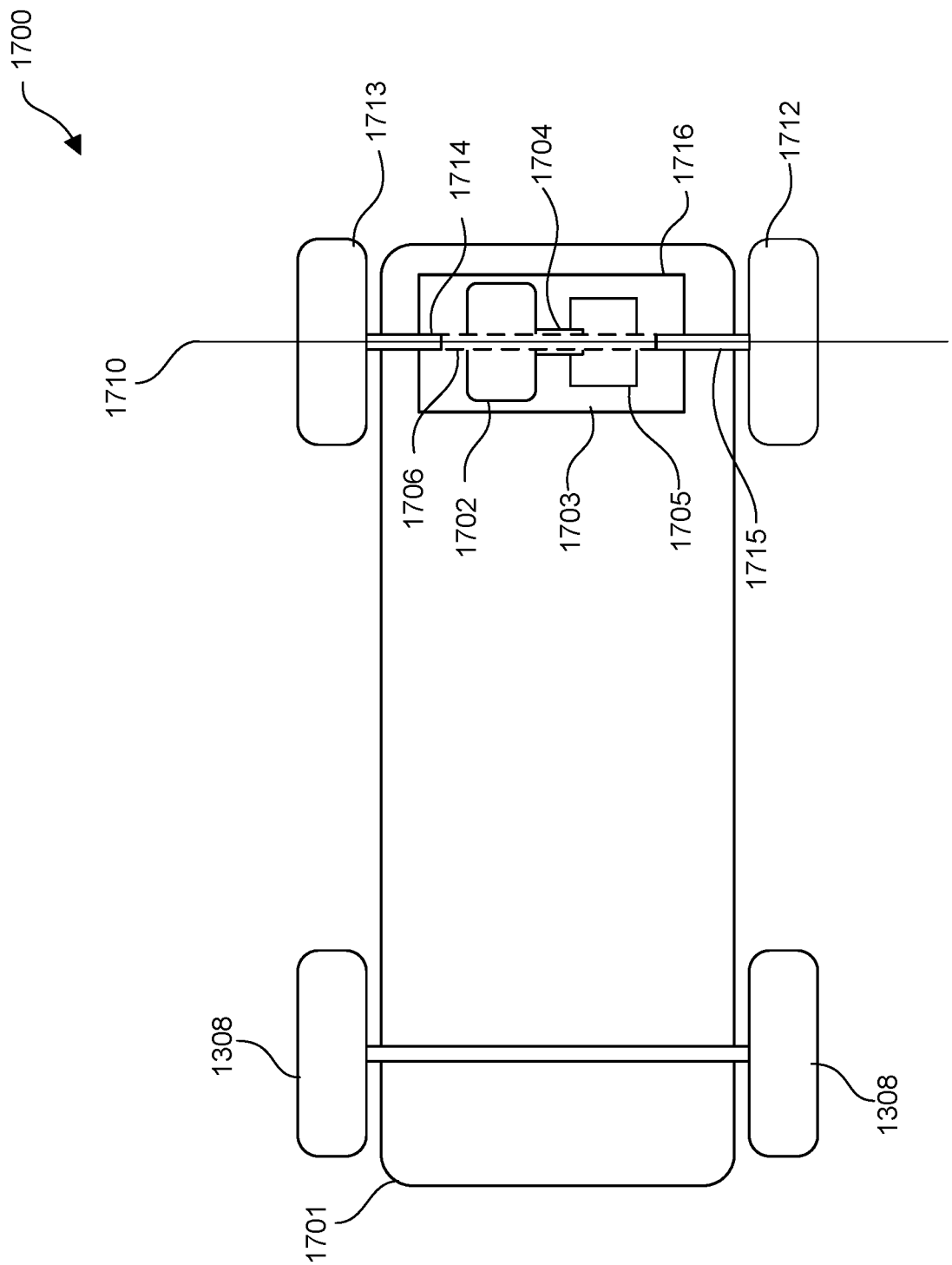
FIG. 17 is a component diagram illustrating another example of the components and configuration of a drive system of the present disclosure.

FIG. 17 illustrates at 1700, another example of a vehicle 1701 that is like the vehicles of the preceding figures but with a different drive train arrangement. Vehicle 1701 optionally includes an electric motor 1702 which may be arranged and configured to provide torque to a transmission 1703 via an input shaft 1704. An output shaft 1706 may be included to carry power from the transmission 1703 to one or more drive axles 1714 and 1715. The three speed transmission may include an arrangement of one or more planetary gearsets 1705, and/or any suitable configuration of brakes, clutches, synchronizers, and the like according to the present disclosure. The gearsets 1705 are optionally configured according to the present disclosure to provide three forward, and three reverse gear ratios. A drive axle 1714 may be configured to receive power from the output shaft 1706 and may be coupled to the gearsets 1705 according to the present disclosure to optionally provide power to a ground engaging member 1713. A drive axle 1715 may be configured to receive power from the output shaft 1706 and may be coupled to the gearsets 1705 according to the present disclosure to optionally provide power to another separate ground engaging member 1712. In another aspect, 1706 may be a split shaft with separate portions engaging the drive axles 1714 and 1715.

In another aspect, the drive system may be arranged and configured so that the electric motor 1702, the transmission 1703, and the drive axles 1714 and 1715 are optionally aligned axially on a common axis 1710. In another aspect, the drive axles 1714 and 1715 optionally pass through a housing of the transmission 1703 and engaging the gearsets 1705 via output shaft 1706. In another aspect, the motor 1702 and the transmission 1703 are optionally mounted axially on a common axis 1710 that is parallel to the drive axles 1714, 1715. In another aspect, at least two ground engaging members 1712 and 1713 are optionally mounted to the drive axle 1715 and 1714 respectively, and the motor 1702 and transmission 1703 are optionally mounted between the ground engaging members. The motor 1702 and the gearsets 1705 may optionally be mounted within a common housing of transmission 1703. In another aspect, the drive axles 1714 and 1715 are positioned to engage the output shaft 1706, and the output shaft is optionally arranged to pass through the input shaft 1704 and an opening or central cavity defined by the electric motor 1702 to provide torque to ground engaging members 1712 and 1713.

In another aspect, the transmission 1703 and gearsets 1705 may be mounted upstream of the motor 1702 with respect to a right ground engaging element 1713. Power optionally flows from the motor 1702 upstream through the input shaft and into the transmission 1703 where it may then transfer through the gearsets 1705 and to the drive axle 1714. Power may then flow downstream through the drive axle 1714 to the right ground engaging element 1713.

In another aspect, the transmission 1703 and gearsets 1705 may be mounted downstream of the motor 1702 with respect to a left ground engaging element 1712. Power optionally flows from the motor 1702 downstream to the transmission 1703 where it may then transfer through the gearsets 1705 and to the drive axle 1715. Power may then flow downstream through the drive axle 1715 to the left ground engaging member 1712. The drive axle 1714 thus optionally extends from the transmission 1703 without passing through a central cavity defined by the motor 1702.

Figure 18:
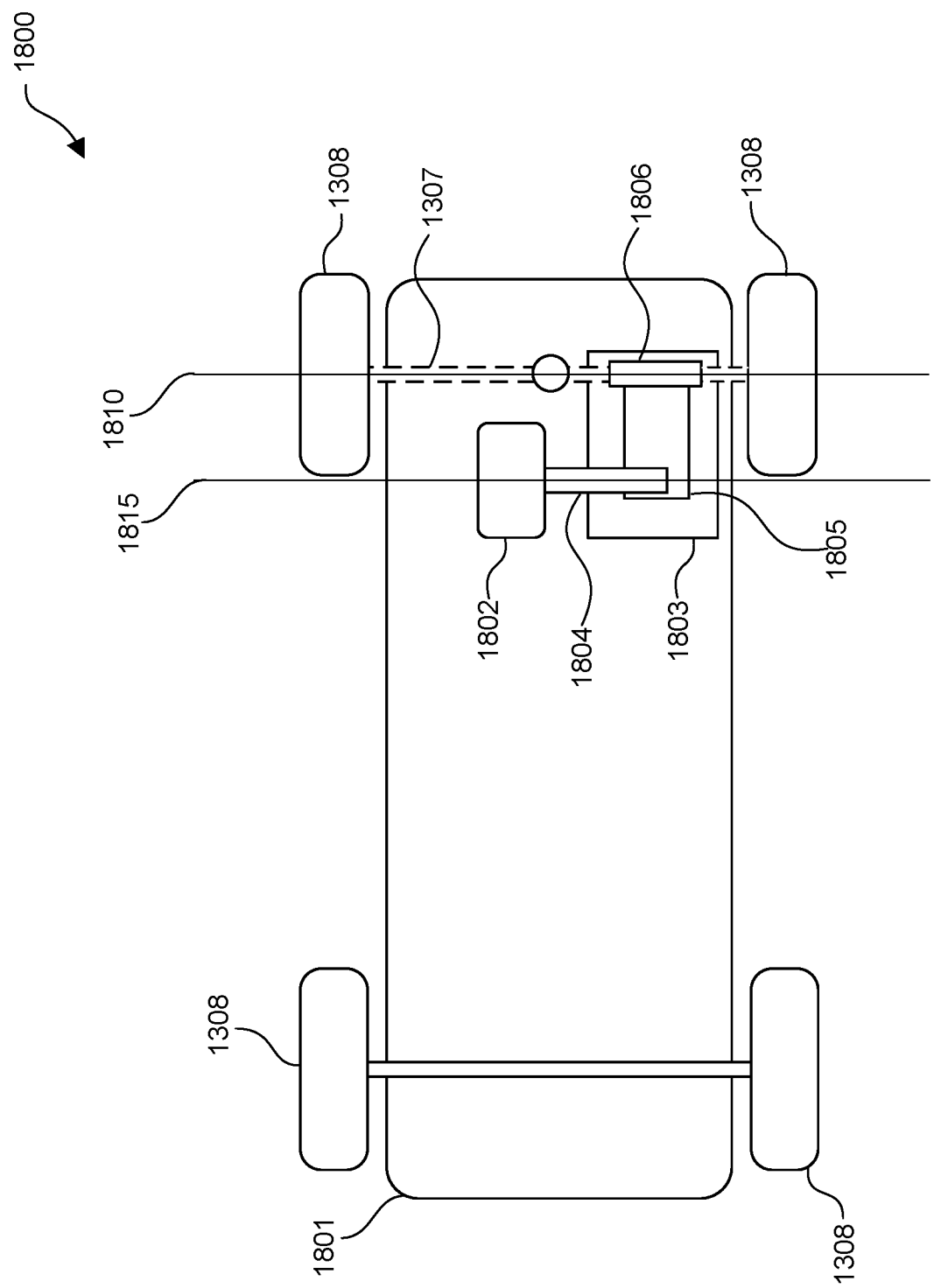
FIG. 18 is a component diagram illustrating another example of the components and configuration of a drive system of the present disclosure.

FIG. 18 illustrates at 1800, another example of a vehicle 1801 that is like the vehicles of the preceding figures but with yet another different drive train arrangement. Vehicle 1801 optionally includes an electric motor 1802 which may be arranged and configured to provide torque to a transmission 1803 via an input shaft 1804. The three speed transmission may include an arrangement of one or more planetary gearsets 1805, and/or any suitable configuration of brakes, clutches, synchronizers, and the like as discussed herein elsewhere. The gearsets 1805 are optionally configured according to the present disclosure to provide three forward, and three reverse gear ratios. A drive axle 1307 may be configured to receive power directly from the transmission 1803 via output shaft 1806. The output shaft 1806 may be coupled to the gearsets 1805 according to the present disclosure to optionally provide power to one or more ground engaging members 1308.

In another aspect, the drive system may be arranged and configured so that the electric motor 1802, the transmission 1803, and drive axle 1307 may be optionally aligned axially on the same axis of rotation 1810. In another aspect, the drive axle 1307 optionally passes through a housing of the transmission 1803 engaging the gearsets 1805 by either a single shaft, or multiple shaft portions, extending outwardly in opposite directions away from transmission 1803.

In another aspect, the electric motor 1802 and the input shaft 1804 may optionally be aligned on a separate axis 1815 that may be parallel to axis 1810. The input shaft 1804 may be parallel to the drive axle 1307 but offset from the drive axle 1307. The motor 1802 and transmission 1803 are thus optionally mounted axially on a common axis 1815 that is parallel to the drive axle 1307. Gearsets 1805 may be configured to engage both the input shaft 1804 and the output shaft 1806. The output shaft 1806 engages the drive axle 1307 which may be a single shaft, or multiple shaft portions, extending outwardly in opposite directions away from transmission 1803. A transmission housing of transmission 1803 is configured to retain the transmission including gearsets 1805 while the drive axle 1307 extends away from the transmission housing to engage at least two ground engaging members 1308 such that the input shaft 1804 and the drive axle 1307 rotate on separate axes of rotation 1815 and 1810 that are parallel.

In another aspect, the transmission 1803 and gearsets 1805 may be mounted downstream of the motor 1802. Power optionally flows from the motor 1802 downstream to the transmission 1803 where it may then transfer through the gearsets 1805 and to the drive axle 1307. The drive axle 1307 thus optionally extends from the transmission 1803 without passing through the central cavity defined by the motor 1802. In another aspect, the drive axle 1307 passes through a housing of the transmission 1803 to engage the planetary gearsets 1805 within the housing of the transmission.

Figure 19:
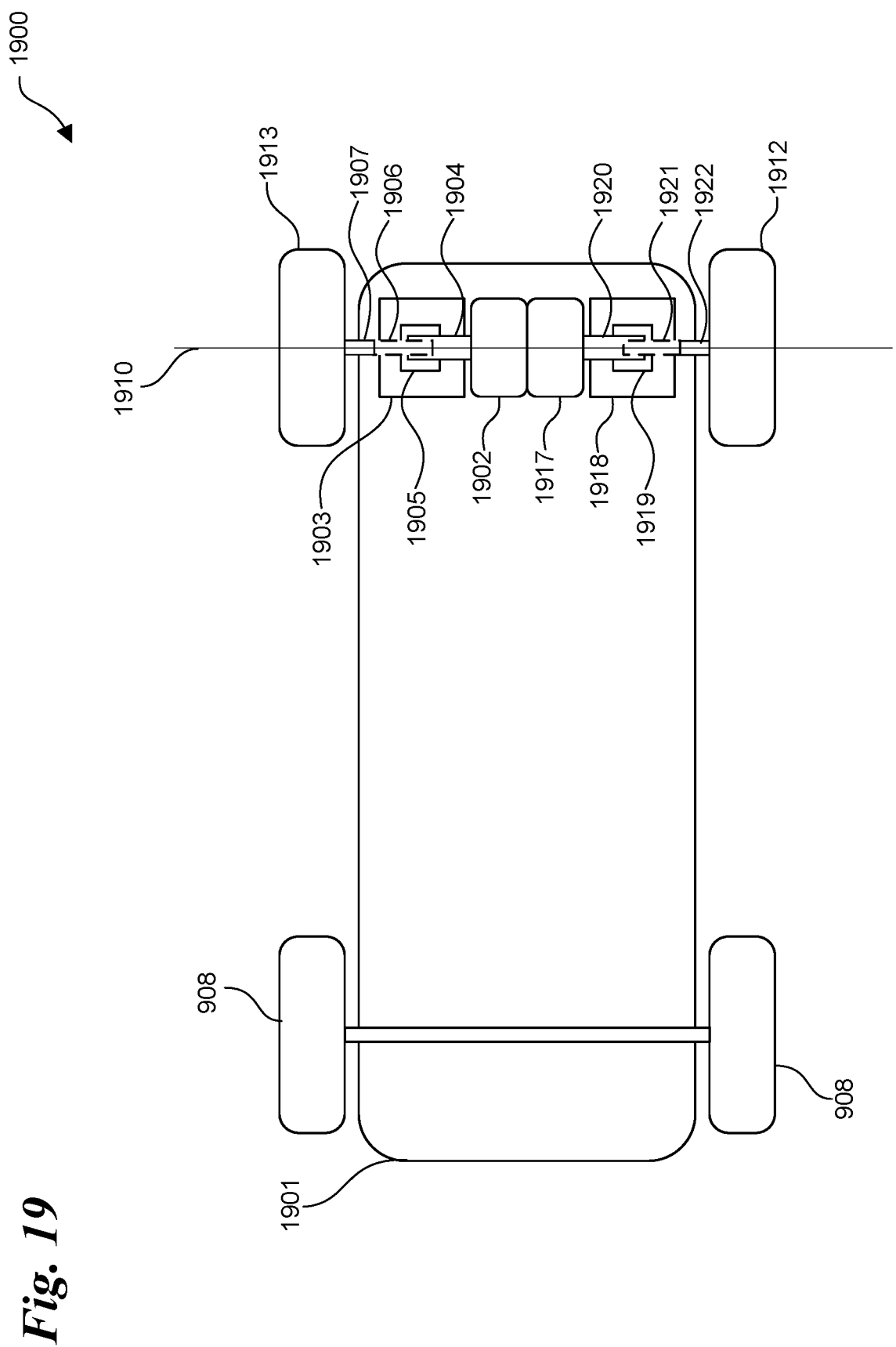
FIG. 19 is a component diagram illustrating another example of the components and configuration of a drive system of the present disclosure.

FIG. 19 illustrates at 1900, another example of a vehicle 1901 that is like other vehicles of the preceding figures, but with another different drive train arrangement. Vehicle 1901 optionally includes a first electric motor 1902, and a second electric motor 1917 arranged and configured to provide torque separately to a first transmission 1903 and a second transmission 1918 via a first input shaft 1904 and a second input shaft 1920. The first electric motor 1902 is optionally coupled to the first transmission 1903, and the second electric motor 1917 is optionally coupled to the second transmission 1918.

In this example, the first and/or the second transmissions 1903 and 1918 optionally include a first gearset 1905 of the present disclosure, and a second gearset 1919 of the present disclosure. Both may include planetary gearsets, clutches, brakes, synchronizers, and the like according to the present disclosure. A first output shaft 1906 may be coupled to drive axle 1907. The drive axle 1907 is optionally coupled to a first ground engaging member 1913. A second output shaft 1921 of the second transmission 1918 is optionally coupled to a second drive axle 1922. The second drive axle 1922 is optionally coupled to a separate ground engaging member 1912 that is different from the first ground engaging member.

In another aspect, the first and second output shafts 1906 and 1921 are rotatable around a common axis of rotation 1910 with the drive axles 1907 and 1922. In another aspect, output shaft 1906 and drive axle 1907 may be a single continuous shaft coupled to ground engaging member 1913. Similarly, output shaft 1921 and drive axle 1922 may be a single continuous shaft coupled to ground engaging member 1912.

In another aspect, the first transmission 1903 and gearsets 1905 may be mounted downstream of the first motor 1902. Power optionally flows from the first motor 1902 downstream to the first transmission 1903 where it may then transfer through the gearsets 1905 and to the first drive axle 1907 via the first output shaft 1906.

Figure 21:
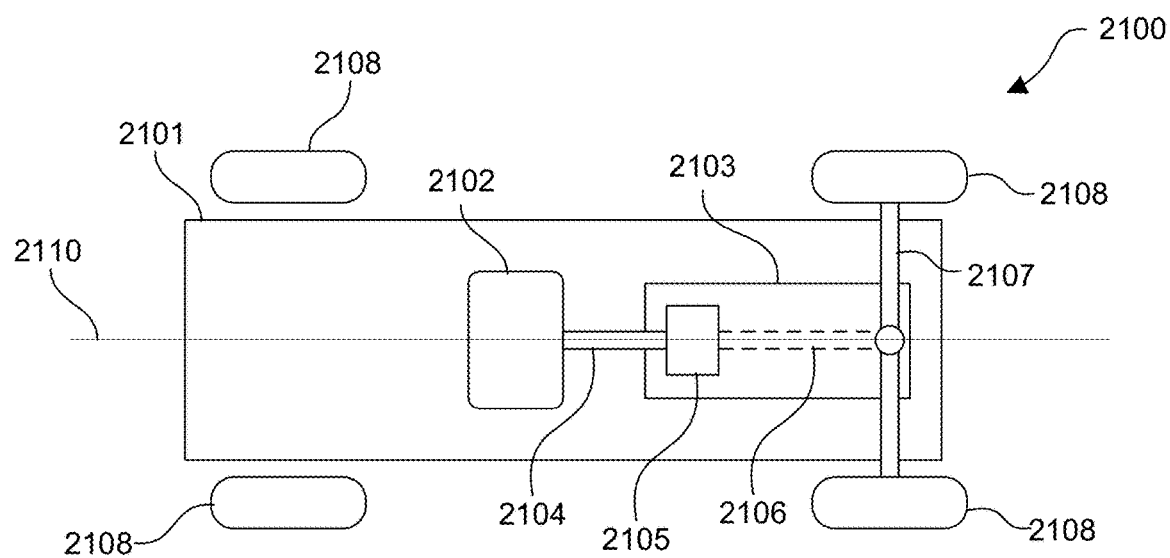
FIG. 21 is a diagram illustrating another example of the components and configuration of a drive system of the present disclosure.

In FIG. 21 at 2100, a vehicle 2101 is shown that optionally includes an electric motor 2102 which may be arranged and configured to provide torque to a transmission 2103 via an input shaft 2104. The three speed transmission may include an arrangement of one or more planetary gearsets 2105, and/or any suitable configuration of brakes, clutches, synchronizers, and the like as disclosed herein. The gearsets 2105 are optionally configured according to the present disclosure to provide three forward, and three reverse gear ratios. An output shaft 2106 of the transmission may be coupled to the gearsets 2105 according to the present disclosure to optionally provide power to a drive axle 2107. One or more ground engaging members 2108 may be included and may be coupled to the output shaft 2106. These ground engaging members may include, for example, tires, wheels, belts, tracks, and the like, or any combination thereof.

In another aspect, the drive system may be arranged and configured so that the motor 2102, the transmission 2103, and the output shaft 2106 are aligned axially on a common axis 2110. This common axis 2110 may optionally be substantially perpendicular to the drive axle 2107. In another aspect, the input shaft 2104 receiving power from the electric motor 2102 may extend outwardly toward the motor 2102 in a different direction from the output shaft 2106. In another aspect, the drive axle 2107 optionally passes through a housing of the transmission 2103, and the output shaft 2106 is optionally contained within the housing of the transmission 2103.

In another aspect, the transmission 2103 and gearsets 2105 may be mounted downstream of the motor. Power optionally flows from the motor 2102 through the input shaft 2104 and into the transmission 2103 where it may then transfer through the gearsets 2105 and to the output shaft 2106. Power may then continue through the output shaft 2106 downstream to the drive axle 2107, and eventually to the ground engaging elements 2108.

Figure 22:
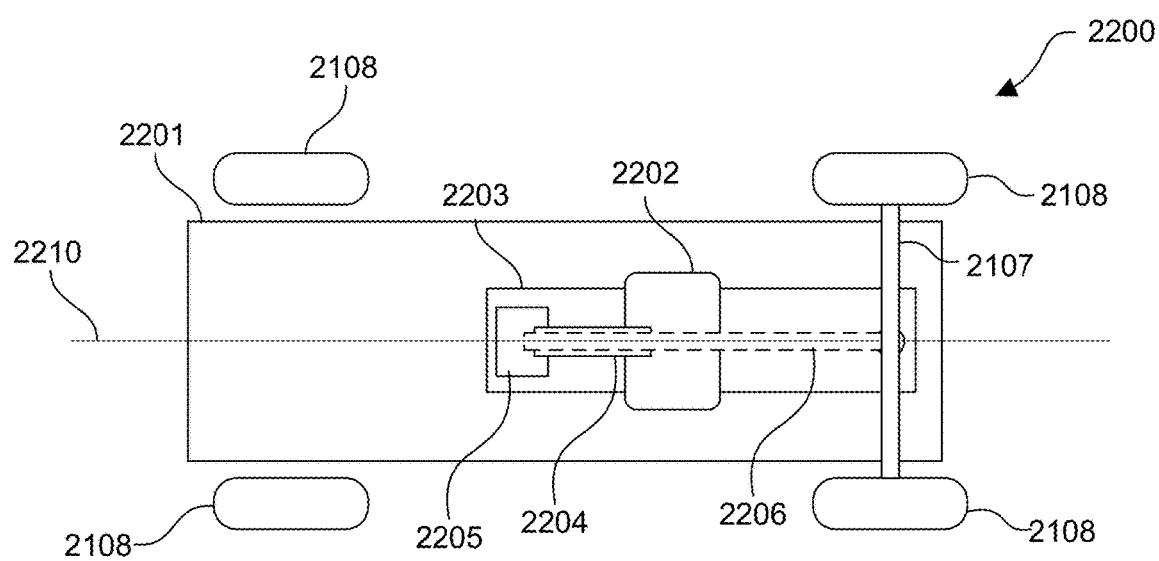
FIG. 22 is a diagram illustrating another example of the components and configuration of a drive system of the present disclosure.

FIG. 22 illustrates at 2200, another example of a vehicle 2201 that is like the vehicles of the preceding figures but with a different drive train arrangement. Vehicle 2201 optionally includes an electric motor 2202 which may be arranged and configured to provide torque to a transmission 2203 via an input shaft 2204. The three speed transmission may include an arrangement of one or more planetary gearsets 2205, and/or any suitable configuration of brakes, clutches, synchronizers, and the like as disclosed herein. The gearsets 2205 are optionally configured according to the present disclosure to provide three forward, and three reverse gear ratios. An output shaft 2206 of the transmission may be coupled to the gearsets 2205 according to the present disclosure to optionally provide power to a drive axle 2107. One or more ground engaging members 2108 may be included and may be coupled to the output shaft 2106.

In another aspect, the drive system may be arranged and configured so that the motor 2202, the transmission 2203, and the output shaft 2206 are aligned axially on a common axis 2210. This common axis 2210 may optionally be substantially perpendicular to the drive axle 2107. In another aspect, the input shaft 2204 receiving power from the electric motor 2202 may extend outwardly away from the motor 2202 toward the gearset, and the output shaft 2206 may extend from the gearset in the opposite direction toward the drive axle. In another aspect, the output shaft 2206 optionally passes through an opening defined by the input shaft 2204 and through an opening defined by the electric motor 2202 to engage with the drive axle 2107. In another aspect, the drive axle 2107 optionally passes through a housing of the transmission 2203, and the output shaft 2206 is optionally contained within the housing of the transmission 2203.

In another aspect, the gearsets 2205 may be mounted upstream of the motor 2202 in the transmission 2203. Power optionally flows from the motor 2202 upstream through the input shaft 2204 and into the gearsets 2205 of the present disclosure where it may then transfer through the gearsets and to the output shaft 2206. Power may then flow downstream through the output shaft 2206 back through the motor 2202, and to drive axle 2107. The output shaft 2206 thus extends from the transmission 2203 to engage the drive axle 2107, and passes through a central cavity defined by the motor 2202.

In another aspect, the second transmission 1918 and gearsets 1919 may be mounted downstream of the second motor 1917. Power optionally flows from the second motor 1917 downstream to the second transmission 1918 where it may then transfer through the gearsets 1919 and to the second drive axle 1922 via the second output shaft 1921.

Figure 20:
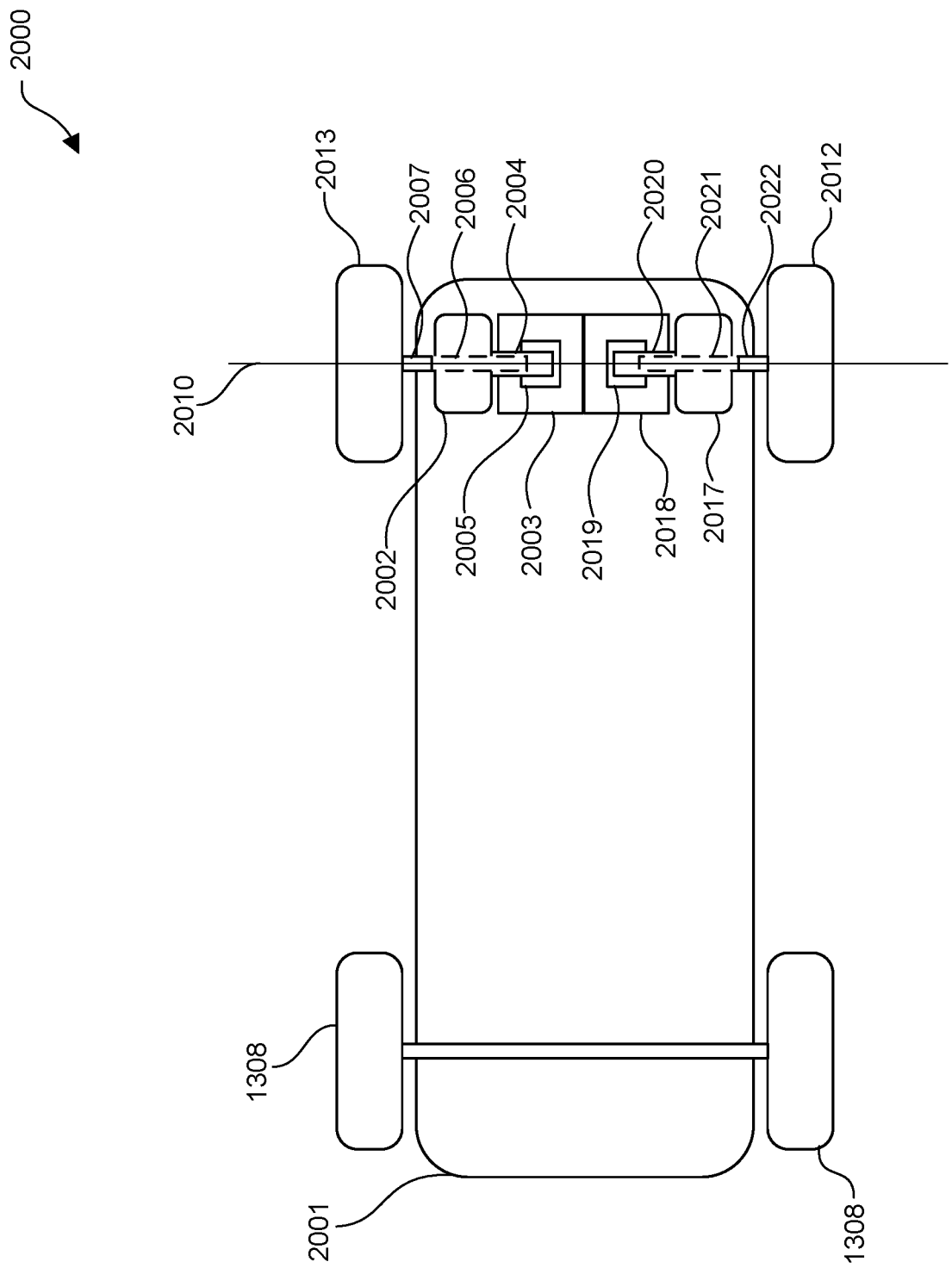
FIG. 20 is a component diagram illustrating another example of the components and configuration of a drive system of the present disclosure.

FIG. 20 illustrates at 2000, another example of a vehicle 2001 that is like other vehicles of the preceding figures, but with another different drive train arrangement. Vehicle 2001 optionally includes a first electric motor 2002, and a second electric motor 2017 arranged and configured to provide torque separately to a first transmission 2003 and a second transmission 2018 via a first input shaft 2004 and a second input shaft 2020. The first electric motor 2002 is optionally coupled to the first transmission 2003 by an input shaft 2004, and the second electric motor 2017 is optionally coupled to the second transmission 2018 by an input shaft 2020. In this example, the first and/or the second transmissions 2003 and 2018 optionally include a first gearset 2005 of the present disclosure, and a second gearset 2019 of the present disclosure. Both may include planetary gearsets, clutches, brakes, synchronizers, and the like according to the present disclosure.

A first output shaft 2006 may be coupled to drive axle 2007. The drive axle 2007 is optionally coupled to a first ground engaging member 2013. A second output shaft 2021 of the second transmission 2018 is optionally coupled to a second drive axle 2022. The second drive axle 2022 is optionally coupled to a separate ground engaging member 2012 that is different from the first ground engaging member.

In another aspect, the first and second output shafts 2006 and 2021 are optionally rotatable around a common axis of rotation 2010 with the drive axles 2007 and 2022. In another aspect, output shaft 2006 and drive axle 2007 may be a single continuous shaft coupled to ground engaging member 2013. Similarly, output shaft 2021 and drive axle 2022 may be a single continuous shaft coupled to ground engaging member 2012.

In another aspect, the first transmission 2003 and gearset 2005 may be mounted upstream of the first motor 2002. Power optionally flows from the first motor 2002 upstream to the first transmission 2003 where it may then transfer through the gearset 2005 to the output shaft 2006. Output shaft 2006 may then pass back through the first motor 2002 to engage the first drive axle 2007. The output shaft 2006 may optionally pass through at least a portion of the input shaft 2004 to engage the gearset 2005 with the drive axle 2007.

In another aspect, the second transmission 2018 and gearsets 2019 may be mounted downstream of the second motor 2017. Power optionally flows from the second motor 2017 upstream to the second transmission 2018 where it may then transfer through the gearsets 2019 to the output shaft 2021. Output shaft 2021 may then pass back through the second motor 2017 to engage the second drive axle 2007. The output shaft 2021 may optionally pass through at least a portion of the input shaft 2020 to engage the gearset 2019 with the drive axle 2022.

The concepts illustrated and disclosed herein related to a drive system may be arranged and configured according to any of the following non-limiting numbered examples:

Example 1: A drive system of the present disclosure for an electric vehicle having a three speed transmission and two simple planetary gearsets with similar gear ratios.

Example 2: The drive system of any preceding example having a first and a second planetary gearset having a sun gear, a carrier with planetary gears, and a ring gear, wherein the carrier of the first planetary gearset is coupled to the sun gear of the second planetary gearset, and wherein the ring gear of the first planetary gearset is coupled to the carrier of the second planetary gearset.

Example 3: The drive system of any preceding example including a first clutch operable to selectively couple an input shaft to the carrier of the first planetary gearset, and the sun gear of the second planetary gearset.

Example 4: The drive system of any preceding example including a second clutch operable to selectively couple the sun gear of the first planetary gearset to the input shaft.

Example 5: The drive system of any preceding example including a brake operable to selectively couple the ring gear of the second planetary gearset to ground, wherein the carrier of the second planetary gearset is coupled to an output shaft.

Example 6: The drive system of any preceding example, wherein the first and second planetary gearsets have substantially the same gear ratios.

Example 7: The drive system of any preceding example, wherein a first gear ratio defined by the first planetary gearset and a second gear ratio defined by the second planetary gearsets differ by less than 0.5:1.

Example 8: The drive system of any preceding example, wherein a first gear ratio defined by the first planetary gearset and a second gear ratio defined by the second planetary gearsets differ by less than 2.5:1.

Example 9: The drive system of any preceding example, wherein a first gear ratio defined by the first planetary gearset and a second gear ratio defined by the second planetary gearsets differ by less than 10:1.

Example 10: The drive system of any preceding example, wherein a first gear is defined by engaging the second clutch and the brake.

Example 11: The drive system of any preceding example, wherein a second gear is defined by engaging the first clutch and the brake.

Example 12: The drive system of any preceding example, wherein a third gear is defined by engaging the first and second clutches.

Example 13: The drive system of any preceding example, wherein two of the first and second clutches and the brake are engaged together at different times to provide three separate speed ratios of the input shaft relative to the output shaft.

Example 14: The drive system of any preceding example, wherein the drive system is configured to shift gear ratios by inverting the engagement state of two of the first and second clutches and the brake while maintaining the remaining first and second clutches or the brake in an engaged state.

Example 15: The drive system of any preceding example, wherein a ratio of the output shaft to the input shaft is between 1:1 and 21:1.

Example 16: The drive system of any preceding example, wherein a ratio of the output shaft to the input shaft is greater than 1:1.

Example 17: The drive system of any preceding example, wherein a ratio of the output shaft to the input shaft is less than 21:1.

Example 18: The drive system of any preceding example a housing that at least partially surrounds the first and second planetary gearsets, wherein the housing operates as the ground.

Example 19: The drive system of any preceding example, wherein the first and second clutches and/or the brake include a dog clutch.

Example 20: The drive system of any preceding example, wherein the first and second clutches and/or the brake include a frictional element.

Example 21: The drive system of any preceding example, wherein the first and second clutches and/or the brake include a synchronizer.

Example 22: The drive system of any preceding example, wherein the rotational direction of the input shaft is directly linked to the rotational direction of the output shaft.

Example 23: The drive system of any preceding example, comprising:
an electric motor coupled to the input shaft.

Example 24: The drive system of any preceding example, comprising one or more ground engaging members coupled to the output shaft.

Example 25: The drive system of any preceding example, wherein the first gear defines a gear ratio between the input shaft and the output shaft that is greater than 20:1.

Example 26: The drive system of any preceding example, wherein the third gear defines a third gear between the input shaft and the output shaft that is about 1:1.

Example 27: Another example of a drive system of the present disclosure that includes a three speed transmission according to any preceding example wherein the carrier of the second planetary gearset is coupled to an output shaft that is coupled to a drive axle.

Example 28: The drive system of any preceding example, wherein the motor, the transmission, and the output shaft are aligned axially perpendicular to the drive axle.

Example 29: The drive system of any preceding example, wherein the output shaft passes through the input shaft and the electric motor to engage with the drive axle.

Example 30: The drive system of any preceding example, wherein the output shaft extends from the transmission to engage the drive axle.

Example 31: The drive system of any preceding example, wherein the drive axle passes through a housing of the transmission and the output shaft is contained within the housing of the transmission.

Example 32: The drive system of any preceding example, wherein the motor and transmission are mounted axially with axes of rotation that are parallel to the drive axle.

Example 33: The drive system of any preceding example that includes at least two ground engaging members mounted to the drive axle, wherein the motor and transmission are mounted between the at least two ground engaging members.

Example 34: The drive system of any preceding example that includes, wherein the output shaft of the transmission passes through the input shaft and the electric motor to engage with the drive axle.

Example 35: The drive system of any preceding example that includes, wherein the output shaft of the transmission and the input shaft of the motor are aligned on a common axis of rotation with the drive axle.

Example 36: The drive system of any preceding example that includes, a transmission housing configured to retain the transmission, wherein the drive axle extends away from the transmission housing to engage at least two ground engaging members, and wherein the input shaft and the drive axle rotate on separate axes of rotation that are parallel to each other.

Example 37: The drive system of any preceding example, wherein the transmission and motor share a common axis of rotation.

Example 38: The drive system of any preceding example, wherein the transmission is mounted downstream of the motor.

Example 39: The drive system of any preceding example, wherein the transmission is mounted upstream of the motor.

Example 40: Another example of a drive system of the present disclosure that includes a first and a second electric motor providing torque separately to a first and a second transmission of any preceding example via a first and a second input shaft coupling the first electric motor to the first transmission, and the second electric motor to the second transmission, wherein the output shaft of the first transmission is coupled to a first ground engaging member, and the output shaft of the second transmission is coupled to a second ground engaging member that is separate from the first ground engaging member.

Example 41: The drive system of example 40, wherein the first and second output shafts are rotatable around a common axis of rotation with the ground engaging member.

Example 42: The drive system of examples 40 and/or or 41, wherein the first transmission is mounted downstream of the first motor, and the second transmission is mounted downstream of the second motor.

Example 43: The drive system of any one of examples 40-42, wherein the first transmission is mounted upstream of the first motor, and the second transmission is mounted upstream of the second motor.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example, if the stated value is 4.375, then use of the term "about 4.375" generally means a range between 3.775 and 4.8125.

"Activate" generally is synonymous with "providing power to", or refers to "enabling a specific function" of a circuit or electronic device that already has power.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic braking systems for example can include electrical motor/generators found in regenerative braking systems.

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Contact" generally refers to a condition and/or state where at least two objects are physically touching. For example, contact requires at least one location where objects are directly or indirectly touching, with or without any other member(s) material in between.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Downstream" generally refers to a direction or relative location that is the same as where power flows in a system.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"Ground" or "Mechanical Ground" generally refers to a physical structure useful for holding one or more mechanical objects stationary relative to that physical structure. When used as a verb, "grounding" a mechanical object in motion generally refers to slowing the mechanical motion to a halt relative to the grounding structure and maintaining it in place.

"High Speed Motor" generally refers to a motor that has a maximum output speed of at least 5,000 rpm (rotations per minute) without the use of gear trains or other similar equipment for boosting speed.

"Interchangeable" generally refers to two or more things that are capable of being put and/or used in place of each other. In other words, one thing is capable of replacing and/or changing places with something else. For example, interchangeable parts typically, but not always, are manufactured to have nearly the same structural size as well as shape within normal manufacturing tolerances and have nearly the same operational characteristics so that one part can be replaced by another interchangeable part. In some cases, the interchangeable parts can be manufactured and/or sold by a specific company under the same part or Stock Keeping Unit (SKU) identifier, and in other cases, different companies can manufacture and/or sell the same interchangeable parts.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Lateral" generally refers to being situated on, directed toward, or coming from the side.

"Longitudinal" generally relates to length or lengthwise dimension of an object, rather than across.

"Low Speed Motor" generally refers to a motor that has a maximum output speed of less than 5,000 rpm (rotations per minute) without the use of gear trains or other similar equipment for boosting speed.

"Means For" in a claim invokes 35 U.S.C. 112(f), literally encompassing the recited function and corresponding structure and equivalents thereto. Its absence does not, unless there otherwise is insufficient structure recited for that claim element. Nothing herein or elsewhere restricts the doctrine of equivalents available to the patentee.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Multiple" as used herein is synonymous with the term "plurality" and refers to more than one, or by extension, two or more.

"Optionally" means discretionary; not required; possible, but not compulsory; left to personal choice.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Portion" means a part of a whole, either separated from or integrated with it.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Predominately" as used herein is synonymous with greater than 50%.

"Rated Continuous Power" or "Continuous Rated Power" generally refer to an amount of energy or work provided per unit of time (i.e., power) an electric motor will produce without interruption for a rated speed, at a rated torque, and at a rated voltage for the electric motor. In other words, the rated continuous power is usually the power that the electric motor can produce for a long period of time at the rated speed and the rated torque without damaging the electric motor.

"Rated Operating Speed" or "Rated Speed" generally refers to a velocity (i.e., speed) an electric motor will rotate when producing a rated continuous power at a supplied rated voltage for the electric motor. Typically, but not always, the rated operating speed is measured in terms of Revolutions Per Minute (rpm). Generally speaking, the rated operating speed is the prescribed rpm at which the motor operates, keeping the mechanical stability and efficiency of the electric motor in mind. The rated voltage and rated horsepower respectively refer to the maximum voltage and horsepower (hp) where the motor can operate efficiently without being damaged. The value for the rated operating speed will be slightly less than a synchronous speed of the electric motor due to a decrease in speed caused by adding a load (i.e., slip or speed loss). For instance, most alternating current (AC) induction motors with synchronous speeds of 1800 RPM will have normally have rated speeds ranging between about 1720 and about 1770 RPM depending on the amount of slip. Some newer high or energy-efficient electric motors will tend to have rated operating speeds towards a higher end of the range.

"Rated Continuous Torque" or "Continuous Rated Torque" generally refer to a magnitude of twisting force, or torque, an electric motor will produce without interruption for a rated speed and at a rated voltage for the electric motor. In other words, the rated continuous torque is usually a torque that the electric motor can output for a long period of time at the rated speed without damaging the electric motor. Typically, this value is generated close to the maximum speed of the motor.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or free-wheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively, or additionally, the SOWC can be controlled to switch or change the locked and free-wheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and free-wheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refer to a property of something having two sides or halves that are the same relative to one another, such as in shape, size, and/or style. In other words, symmetric describes something as having a mirror-image quality.

"Synchronizer" or "Synchronizer Mechanism" ("Synchromesh") generally refer to a device that includes a cone clutch and a blocking ring which brings the speeds of a gear and a gear selector to the same speed using friction. In one example, before the teeth of the gear and gear selector can engage, the cone clutch engages first which in turn brings the gear selector and gear to the same speed using friction. Until synchronization occurs, the teeth of the gear and the gear selector are prevented from making contact by the blocking ring. When synchronization occurs, the friction on the blocking ring is relieved and the blocking ring twists slightly. With this twisting motion, grooves or notches are aligned that allow further passage of the gear selector which brings the teeth together.

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Uninterrupted Connection" generally refers to a mechanical linkage between two mechanical components without any break in continuity such that mechanical force can be transmitted on a continuous basis if so desired. The uninterrupted connection does not require a unitary connection such that the uninterrupted connection can include multiple components such as multiple shafts and gears that engage with one another. The uninterrupted connection lacks mechanisms or other structures, such as clutches, that are designed to disconnect and reconnect the mechanical linkage between the components during normal operation. It should be recognized that the uninterrupted connection can occasionally have accidental breakages that disconnect the components, but the design of the uninterrupted connection is not designed to facilitate such breakages and resulting disconnections.

"Upstream" generally refers to a direction or relative location that is opposite from where power flows in a system.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

What is claimed is:

1. A drive system, comprising:
   a first and a second planetary gearset having a sun gear, a carrier with planetary gears, and a ring gear, wherein the carrier of the first planetary gearset is coupled to the sun gear of the second planetary gearset, and wherein the ring gear of the first planetary gearset is coupled to the carrier of the second planetary gearset;
   a first clutch operable to selectively couple an input shaft to the carrier of the first planetary gearset, and the sun gear of the second planetary gearset;

a second clutch operable to selectively couple the sun gear of the first planetary gearset to the input shaft; and a brake operable to selectively couple the ring gear of the second planetary gearset to ground;

an electric motor coupled to the input shaft;

wherein the carrier of the second planetary gearset is coupled to an output shaft, wherein the first and second planetary gearsets are mounted upstream of the motor and;

wherein the output shaft and the input shaft are aligned on a common axis of rotation with a drive axle.

2. The drive system of claim 1, wherein a first gear is defined by engaging the second clutch and the brake.

3. The drive system of claim 1, wherein a second gear is defined by engaging the first clutch and the brake.

4. The drive system of claim 1, wherein a third gear is defined by engaging the first and second clutches.

5. The drive system of claim 1, wherein two of the first and second clutches and the brake are engaged together at different times to provide three separate speed ratios of the input shaft relative to the output shaft.

6. The drive system of claim 5, wherein the drive system is configured to shift gear ratios by inverting an engagement state of two of the first and second clutches and the brake while maintaining the remaining first or second clutch or brake in an engaged state.

7. The drive system of claim 1, comprising:
a housing that at least partially surrounds the first and second planetary gearsets, wherein the housing operates as the ground.

8. The drive system of claim 1, wherein the first and second clutches and/or the brake include a dog clutch.

9. The drive system of claim 1, wherein the first and second clutches and/or the brake include a frictional element.

10. The drive system of claim 1, wherein the first and second clutches and/or the brake include a synchronizer.

11. The drive system of claim 1, wherein a rotational direction of the input shaft is directly linked to a rotational direction of the output shaft.

12. The drive system of claim 1, comprising:
one or more ground engaging members coupled to the output shaft.

13. A drive system comprising:
a transmission that includes:
a first and a second planetary gearset having a sun gear, a carrier with planetary gears, and a ring gear, wherein the carrier of the first planetary gearset is coupled to the sun gear of the second planetary gearset, and wherein the ring gear of the first planetary gearset is coupled to the carrier of the second planetary gearset;
a first clutch operable to selectively couple an input shaft to the carrier of the first planetary gearset, and the sun gear of the second planetary gearset;
a second clutch operable to selectively couple the sun gear of the first planetary gearset to the input shaft; and
a brake operable to selectively couple the ring gear of the second planetary gearset to ground;
an electric motor arranged and configured to transmit torque to the transmission via the input shaft;
wherein the carrier of the second planetary gearset is coupled to an output shaft that is coupled to a drive axle;
wherein the motor, the transmission, and the output shaft are aligned axially perpendicular to the drive axle;
wherein the transmission is mounted upstream of the motor; and
wherein the output shaft passes through the input shaft and the electric motor to engage with the drive axle.

14. The drive system of claim 13 wherein the output shaft extends from the transmission to engage the drive axle.

15. The drive system of claim 13, wherein the drive axle passes through a housing of the transmission and the output shaft is contained within the housing of the transmission.

16. A drive system comprising:
a transmission that includes:
a first and a second planetary gearset having a sun gear, a carrier with planetary gears, and a ring gear, wherein the carrier of the first planetary gearset is coupled to the sun gear of the second planetary gearset, and wherein the ring gear of the first planetary gearset is coupled to the carrier of the second planetary gearset;
a first clutch operable to selectively couple an input shaft to the carrier of the first planetary gearset, and the sun gear of the second planetary gearset;
a second clutch operable to selectively couple the sun gear of the first planetary gearset to the input shaft; and
a brake operable to selectively couple the ring gear of the second planetary gearset to ground;
an electric motor arranged and configured to transmit torque to the transmission via the input shaft;
wherein the carrier of the second planetary gearset is coupled to an output shaft that is coupled to a drive axle;
wherein the motor and transmission are mounted axially on a common axis that is parallel to the drive axle; and
wherein the output shaft of the transmission passes through the input shaft and the electric motor to engage with the drive axle.

17. The drive system of claim 16, wherein the transmission is mounted upstream of the motor.

18. The drive system of claim 16, wherein the transmission is mounted downstream of the motor.

19. The drive system of claim 16, comprising:
at least two ground engaging members mounted to the drive axle, wherein the motor and transmission are mounted between the at least two ground engaging members.

20. The drive system of claim 16, wherein the output shaft of the transmission and the input shaft of the motor are aligned on a common axis of rotation with the drive axle.

* * * * *